US012198327B2

(12) United States Patent
Yumiba et al.

(10) Patent No.: US 12,198,327 B2
(45) Date of Patent: Jan. 14, 2025

(54) MEASUREMENT SYSTEM, METHOD FOR GENERATING LEARNING MODEL TO BE USED WHEN PERFORMING IMAGE MEASUREMENT OF SEMICONDUCTOR INCLUDING PREDETERMINED STRUCTURE, AND RECORDING MEDIUM FOR STORING PROGRAM FOR CAUSING COMPUTER TO EXECUTE PROCESSING FOR GENERATING LEARNING MODEL TO BE USED WHEN PERFORMING IMAGE MEASUREMENT OF SEMICONDUCTOR INCLUDING PREDETERMINED STRUCTURE

(71) Applicant: Hitachi High-Tech Corporation, Tokyo (JP)

(72) Inventors: Ryou Yumiba, Tokyo (JP); Kei Sakai, Tokyo (JP); Satoru Yamaguchi, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 451 days.

(21) Appl. No.: 17/634,805

(22) PCT Filed: Aug. 30, 2019

(86) PCT No.: PCT/JP2019/034050
§ 371 (c)(1),
(2) Date: Feb. 11, 2022

(87) PCT Pub. No.: WO2021/038815
PCT Pub. Date: Mar. 4, 2021

(65) Prior Publication Data
US 2022/0277434 A1 Sep. 1, 2022

(51) Int. Cl.
*G06T 7/00* (2017.01)
*G01N 21/95* (2006.01)
(Continued)

(52) U.S. Cl.
CPC .......... *G06T 7/001* (2013.01); *G01N 21/9505* (2013.01); *G06T 7/11* (2017.01);
(Continued)

(58) Field of Classification Search
CPC ... G06T 7/001; G06T 7/11; G06T 7/66; G06T 2207/20021; G06T 2207/20081;
(Continued)

(56) References Cited

U.S. PATENT DOCUMENTS 11,205,119 B2 * 12/2021 Karlinsky .......... G06F 18/24133
2009/0063378 A1 * 3/2009 Izikson ............... G03F 7/70633
706/21

(Continued)

FOREIGN PATENT DOCUMENTS

JP  2010-538474 A  12/2010
JP  2018-506168 A   3/2018
(Continued)

OTHER PUBLICATIONS

Korean-language Office Action issued in Korean Application No. 10-2022-7004040 dated Mar. 18, 2024 (5 pages).
(Continued)

*Primary Examiner* — Bobbak Safaipour
*Assistant Examiner* — Ashley L. Hytrek
(74) *Attorney, Agent, or Firm* — Crowell & Moring LLP

(57) ABSTRACT

The present invention proposes a technique for enabling the execution of measurement processing without referring to a design drawing for which it is difficult to adjust or obtain parameters for image processing that requires knowhow. This measurement system according to the present disclo-
(Continued)

sure refers to a learning model generated on the basis of teaching data, which is generated from a sample image of a semiconductor, and the sample image, generates a region-segmented image from an input image (measurement subject) of a semiconductor having a predetermined structure, and uses the region-segmented image to perform image measurement. Here, the teaching data is an image in which labels, which include a structure of the semiconductor in the sample image, are assigned to each pixel of the image, and the learning model includes parameters for deducing teaching data from the sample image (see indicator 1).

19 Claims, 19 Drawing Sheets

(51) Int. Cl.
  *G06T 7/11* (2017.01)
  *G06T 7/66* (2017.01)
  *G06V 10/72* (2022.01)
  *G06V 10/764* (2022.01)
  *G06V 10/774* (2022.01)
  *G06V 10/82* (2022.01)

(52) U.S. Cl.
  CPC .............. *G06T 7/66* (2017.01); *G06V 10/72* (2022.01); *G06V 10/764* (2022.01); *G06V 10/774* (2022.01); *G06V 10/82* (2022.01); *G06T 2207/20021* (2013.01); *G06T 2207/20081* (2013.01); *G06T 2207/20084* (2013.01); *G06T 2207/30148* (2013.01)

(58) Field of Classification Search
  CPC ........... G06T 2207/20084; G06T 2207/30148; G06V 10/72; G06V 10/764; G06V 10/774; G06V 10/82
  See application file for complete search history.

(56) References Cited

U.S. PATENT DOCUMENTS

| | | |
|---|---|---|
| 2016/0163035 A1 | 6/2016 | Chang et al. |
| 2017/0018066 A1 | 1/2017 | Weinberg et al. |
| 2019/0017817 A1 | 1/2019 | Fukunaga |
| 2019/0130554 A1 | 5/2019 | Rothberg et al. |
| 2019/0287761 A1* | 9/2019 | Schoenmakers ........ G06T 7/174 |
| 2020/0271595 A1* | 8/2020 | Rosenberg .............. G06T 17/10 |

FOREIGN PATENT DOCUMENTS

| | | |
|---|---|---|
| JP | 2018-522238 A | 8/2018 |
| JP | 2019-110120 A | 7/2019 |
| KR | 10-2018-0095635 | 8/2018 |
| TW | 201923776 A | 6/2019 |
| WO | WO 2017/130365 A1 | 8/2017 |

OTHER PUBLICATIONS

International Search Report (PCT/ISA/210) issued in PCT Application No. PCT/2019/034050 dated Dec. 3, 2019, with English translation (three (3) pages).
Japanese-language Written Opinion (PCT/ISA/237) issued in PCT Application No. PCT/2019/034050 dated Dec. 3, 2019 (four (4) pages).
Taiwanese-language Office Action issued in Taiwanese Application No. 109122244 dated Jun. 15, 2021 (five (5) pages).

* cited by examiner

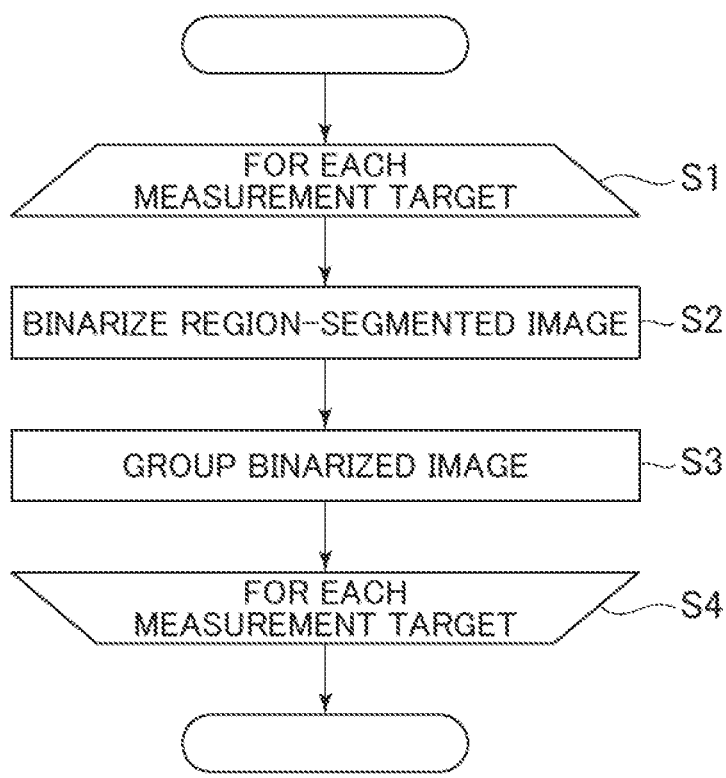

FIG. 12

| NUMBER | X COORDINATE | Y COORDINATE |
|---|---|---|
| 1 | X COORDINATE 1 | Y COORDINATE 1 |
| 2 | X COORDINATE 2 | Y COORDINATE 2 |
| ... | ... | ... |
| N | X COORDINATE N | Y COORDINATE N |

| MEASUREMENT TARGET | COORDINATE | LABEL |
|---|---|---|
| FIRST MEASUREMENT TARGET | X1 AND Y1 | LABEL 41 |
| SECOND MEASUREMENT TARGET | X2 | LABEL 41 OR LABEL 42 |
| SECOND MEASUREMENT TARGET | Y2 | LABEL 44 |

MEASUREMENT SYSTEM, METHOD FOR GENERATING LEARNING MODEL TO BE USED WHEN PERFORMING IMAGE MEASUREMENT OF SEMICONDUCTOR INCLUDING PREDETERMINED STRUCTURE, AND RECORDING MEDIUM FOR STORING PROGRAM FOR CAUSING COMPUTER TO EXECUTE PROCESSING FOR GENERATING LEARNING MODEL TO BE USED WHEN PERFORMING IMAGE MEASUREMENT OF SEMICONDUCTOR INCLUDING PREDETERMINED STRUCTURE

TECHNICAL FIELD

The present disclosure relates to a measurement system, a method for generating a learning model to be used when performing image measurement of a semiconductor including a predetermined structure, and a recording medium storing a program for causing a computer to perform processing for generating a learning model to be used when performing image measurement of a semiconductor including a predetermined structure.

BACKGROUND ART

In recent years, the miniaturization of patterns manufactured by semiconductor processes is progressing, and there is a demand to superimpose a pattern over a plurality of layers of an exposure apparatus, that is, there is a demand to improve the accuracy of an overlay. In addition, it is expected that the importance of measuring an overlay with high accuracy and feeding the overlay back to an exposure device will increase in the future.

Regarding the overlay measurement, for example, Patent Literature 1 discloses a technique for extracting a plurality of luminance regions segmented based on luminance boundaries on an input image by image processing and performing overlay measurement from the positional relationship of the centers of gravity of the luminance regions. In addition, Patent Literature 2 discloses a technique for referring to a design image such as a CAD image or an input image estimated from a design image, segmenting a region of the input image in units of pixels, and performing overlay measurement from the positional relationship of the centers of gravity of the segmented regions. In addition, Patent Literature 3 discloses a technique for using a sample of an image collected in advance and to be subjected to overlay measurement to learn a machine learning model that infers an overlay amount (displacement of the position of a structure of a semiconductor to be subjected to overlay measurement), and referring to the machine learning model to measure the overlay amount from an input image.

CITATION LIST

Patent Literature

Patent Literature 1: WO2017/130365
Patent Literature 2: Japanese Unexamined Patent Application Publication NO. 2018-522238
Patent Literature 3: Japanese Unexamined Patent Application Publication NO. 2010-538474

SUMMARY OF INVENTION

Technical Problem

However, in the technique disclosed in Patent Literature 1, it is necessary to manually adjust a parameter during the image processing according to the input image. In addition, since know-how is also required for the adjustment of the parameter, there is a problem that an operator who performs the overlay measurement is limited to an expert.

In addition, in the technique disclosed in Patent Literature 2, there is a problem that it cannot be operated when the design image cannot be obtained because the design image is not disclosed.

In addition, in the technique disclosed in Patent Literature 3, since a process of measuring the overlay amount from the input image cannot be visually confirmed, there is a problem that factor analysis is difficult when an unexpected overlay amount is measured from the input image.

The present disclosure has been made in view of such circumstances, and proposes a technique for enabling the execution of a measurement process without parameter adjustment in image processing for which know-how is required and without reference to a design diagram that may be difficult to obtain.

Solution to Problems

To achieve the aforementioned object, according to an aspect of the present disclosure, a method for generating a learning model to be used when performing image measurement of a semiconductor including a predetermined structure includes causing at least one processor to generate training data by assigning a label including a structure of at least one measurement target to a region-segmented image obtained from a sample image of the semiconductor; and causing the at least one processor to generate the learning model using the region-segmented image of the sample image and the training data based on a network structure of a plurality of layers, and the learning model includes a parameter for inferring the training data from the sample image.

Further characteristics relating to the present disclosure are clarified from the description of the present specification and the accompanying drawings. In addition, aspects of the present disclosure are achieved and implemented by components, a combination of various components, the following detailed description, and aspects of the appended claims.

The description of the present specification is only a typical example and does not limit the claims or applications of the present disclosure in any sense.

Advantageous Effects of Invention

According to the present disclosure, it is possible to perform a measurement process without parameter adjustment in image processing for which know-how is required and without reference to a design diagram that may be difficult to obtain.

BRIEF DESCRIPTION OF DRAWINGS

FIG. 9 is a flowchart for explaining details of a grouping process to be performed by the grouping unit 4.

FIG. 10 is a diagram (table) illustrating an example of labels that are first and second measurement targets to be subjected to overlay measurement.

FIG. 12 is a diagram illustrating an example of a configuration of template data 85.

FIG. 13 is a diagram (table) illustrating another example of the labels that are the first and second measurement targets to be subjected to the overlay measurement.

DESCRIPTION OF EMBODIMENTS

Figure 1:
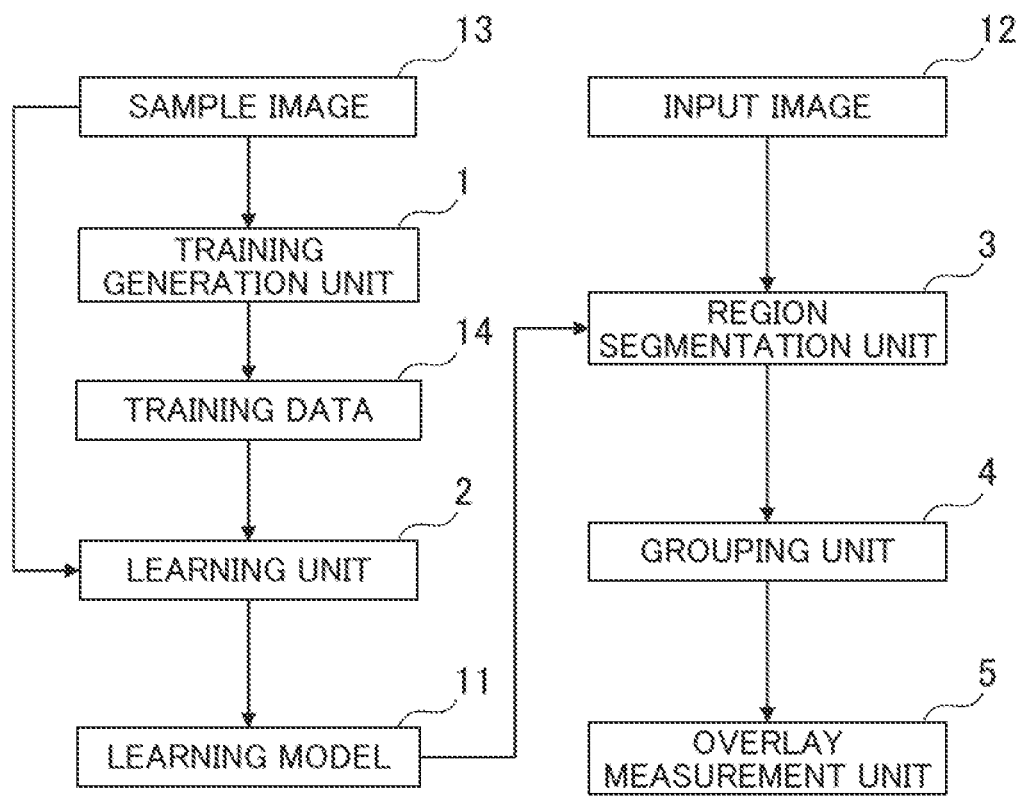
FIG. 1 is a diagram illustrating an example of a functional configuration from training data generation to overlay measurement according to Example 1.

The present embodiment and each Example relate to a measurement system for performing image measurement of a semiconductor having a predetermined structure (for example, multi-layer structure) and more specifically to a measurement system for performing overlay measurement to measure a displacement between layers when a semiconductor has a multi-layer structure. However, a technique according to the present disclosure is not limited to overlay measurement and can be applied to a wide variety of image measurement in general.

Hereinafter, the embodiment and Examples of the present disclosure are described with reference to the accompanying drawings. In the accompanying drawings, components that are functionally the same are indicated by the same reference numerals in some cases. The accompanying drawings indicate the specific embodiment and the Examples in accordance with the principles of the present disclosure, but are provided to understand the present disclosure and are not used to limit the interpretation of the present disclosure.

Although the present embodiment is described in sufficient detail for those skilled in the art to implement the present disclosure, it is necessary to understand that other implementations and forms are possible and that it is possible to change configurations and structures and replace various components without departing from the scope and spirit of the technical idea of the present disclosure. Therefore, the following description should not be interpreted to be limited thereto.

In addition, the embodiment of the present disclosure may be implemented by software that to be executed on a general-purpose computer, or may be implemented by dedicated hardware or a combination of software and hardware.

In the following description, information is described using a "table" format in the present disclosure, but the information may not be expressed in a data structure with a table and may be expressed in a list, a DB, a data structure such as a queue, or another form. Therefore, a "table", a "list", a "DB", a "queue", and the like are simply referred to as "information" in order not to depend on a data structure.

In addition, to explain details of the information, expressions such as a "number", "identification information", an "identifier", an "appellation", a "name", and an "ID" can be used, and they can be replaced with each other.

(1) Embodiment

The present embodiment (and Examples 1 to 6) relates to a measurement system for performing image measurement of a semiconductor having a predetermined structure (for example, a multi-layer structure). The measurement system refers to a learning model generated based on training data generated from a sample image of a semiconductor and the sample image, generates a region-segmented image from an input image (measurement target) of a semiconductor having a predetermined structure, and uses the region-segmented image to perform the image measurement. The training data is an image in which a label including a structure of the semiconductor in the sample image is assigned to each pixel of the image. The learning model includes a parameter for inferring the training data from the sample image. The inference of the training data from the sample image is applied to the input image by using the learning model. Therefore, a measurement process can be performed without using design data of the input image.

Figure 31:
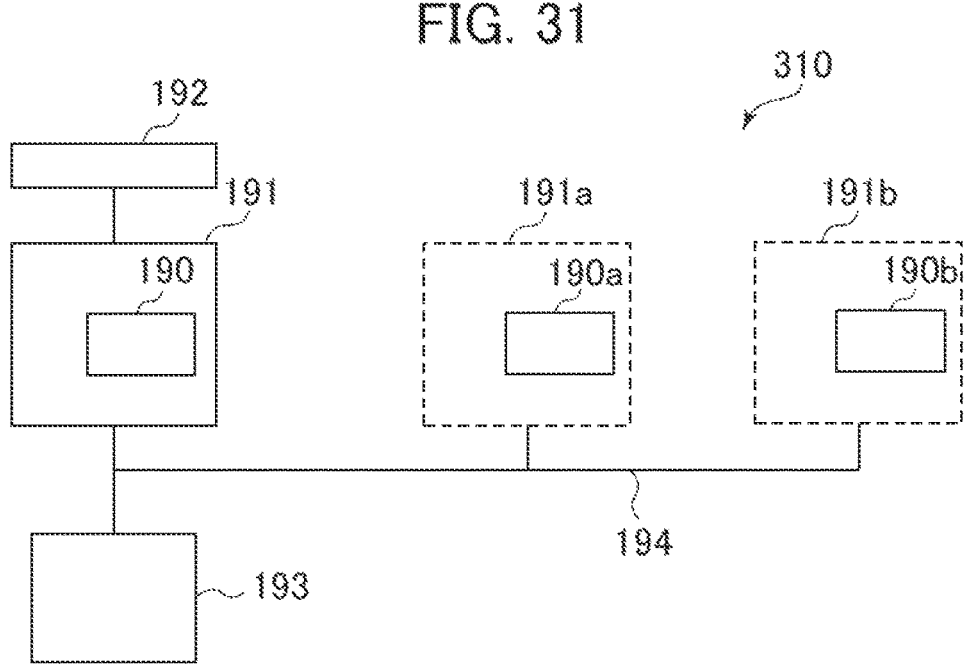
FIG. 31 is a diagram illustrating an example of a schematic configuration of a measurement system 310 according to the present embodiment (common to each embodiment).

FIG. 31 is a diagram illustrating an example of a schematic configuration of a measurement system 310 according to the present embodiment (common to each Example). The measurement system 310 corresponds to, for example, an overlay measurement system that performs overlay measurement, a dimension measurement system that extracts a contour within a semiconductor image and measures a dimension such as the shape of a hole, a defective pattern detection system that detects a defective pattern, a pattern matching system that infers a design diagram and searches for a position where the inferred design diagram and an actual design diagram are crosschecked, or the like.

The measurement system 310 includes, for example, a main calculator 191 including a main processor 190, an input and output device 192 that inputs an instruction and data to the main calculator 191 and outputs an computation result, a server calculator 193 (hereinafter referred to as an electronic microscope or the like) that is an electronic microscope for supplying an image to be measured or accumulates an image of the electronic microscope, a first sub-calculator 191a including a first sub-processor 190a, and a second sub-calculator 191b including a second sub-processor 190b, and these constituent components are connected to each other via a network (for example, a LAN or the like). In FIG. 31, the two first and second sub-calculators 191a and 191b are provided, but all computations may be performed in the main calculator or one or more sub-calculators may be provided to support the main calculator 191.

The main calculator 191 performs a training generation process and a learning model generation process (that are processes corresponding to a training generation unit and a learning unit in each drawing) in FIGS. 1, 14, 16, 22, 26, and 30. In addition, an inference process and a measurement process (that are processes corresponding to a region segmentation unit, a grouping unit, and a measuring unit (overlay measurement unit) in each drawing) may be performed by the main calculator 191 or may be performed by the first sub-calculator 191a and the second sub-computer 191b in a distributed manner. The first sub-calculator 191a and the second sub-calculator 191b may be configured to perform only the inference process and the measurement process and not to perform the training generation process and the learning model generation process. In addition, when a plurality of sub-calculators is provided (for example, the first sub-calculator 191a and the second sub-calculator 191b), the inference process and the measurement process may be distributed between the sub-calculators.

The electronic microscope or the like 193 acquires (captures) an image of a semiconductor pattern formed on a wafer and provides the semiconductor pattern image to the main calculator 191 and the sub-calculators 191a and 191b. When the electronic microscope or the like 193 is a server calculator, the server calculator stores the semiconductor pattern image captured by the electronic microscope in a storage device (for example, a hard disk drive (HDD)), responds to an instruction of the main calculator 191, and provides an image corresponding to the instruction to the main calculator 191 and the like.

Each Example of a process to be performed by the measurement system 310 is described in detail. In Examples 1 to 5, overlay measurement is exemplified as an example of measurement. In Example 6, it is clarified that the technique according to the present disclosure can be applied to all measurement processes.

(2) Example 1

FIG. 1 is a diagram illustrating an example of a functional configuration from training data generation to overlay measurement according to Example 1. Functions of the training generation unit 1 and the learning unit 2 are implemented by the main processor 190 of the main calculator 191 reading each corresponding process program from a storage unit not illustrated. In addition, functions of the region segmentation unit 3, the grouping unit 4, and the overlay measurement unit 5 are implemented by the main processor 190 of the main calculator 191 or the sub-processors 190a and 190b of the sub-calculators 191a and 191b reading each corresponding program from a storage unit not illustrated.

<Overview of Functional Configuration>

First, an overview of the functional configuration from the training data generation to the overlay measurement illustrated in FIG. 1 is described. A sample image 13 is a sample of an image collected in advance and to be subjected to the overlay measurement. Training data 14 is data in which a region-segmented image in which a label including a structure in a semiconductor to be measured in the overlay measurement is assigned to each pixel in the image is prepared for each sample image 13.

The training generation unit 1 generates the training data 14 from the sample image 13 and provides a user interface for generating the training data 14. The learning model 11 is a parameter such as a coefficient or the like in a machine learning model for calculating a region image to be segmented from an image (for example, the sample image). The learning unit 2 calculates the learning model 11 that infers a region-segmented image approximate to the training data 14 as much as possible when the sample image 13 is input.

The input image 12 is an image to be measured in the overlay measurement. The region segmentation unit 3 refers to the learning model 11 and infers a region-segmented image from the input image 12. The grouping unit 4 groups a target included in the region-segmented image and to be measured in the overlay measurement into small regions. The overlay measurement unit 5 performs the overlay measurement from the positions of the small regions grouped by the grouping unit 4.

The aforementioned functions of the training generation unit 1, the learning unit 2, the region segmentation unit 3, the grouping unit 4, and the overlay measurement unit 5 can be implemented by signal processing in any calculator.

<Details of Each Functional Configuration>

Each functional configuration according to Example 1 is described below in detail. The sample image 13 is an image captured before the operation of the overlay measurement and is an image of a semiconductor sample to be measured or is a sample image that looks similar to the semiconductor sample to be measured. The sample image 13 can be collected by an electronic microscope that operates the overlay measurement or an electronic microscope whose image quality is close to that of the electronic microscope.

Figure 2:
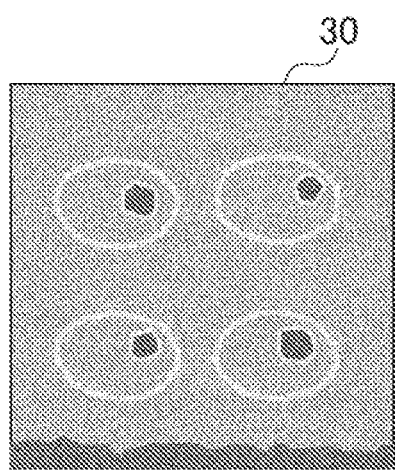
FIG. 2 is a diagram illustrating an example of a sample image.

(i) FIG. 2 is a diagram illustrating an example of the sample image. An image 30 illustrated in FIG. 2 indicates a part of the sample image, for example. The image 30 includes a structure of the semiconductor to be subjected to the overlay measurement. The sample image is constituted by one or more images that are the same as or similar to the image 30.

Figure 3:
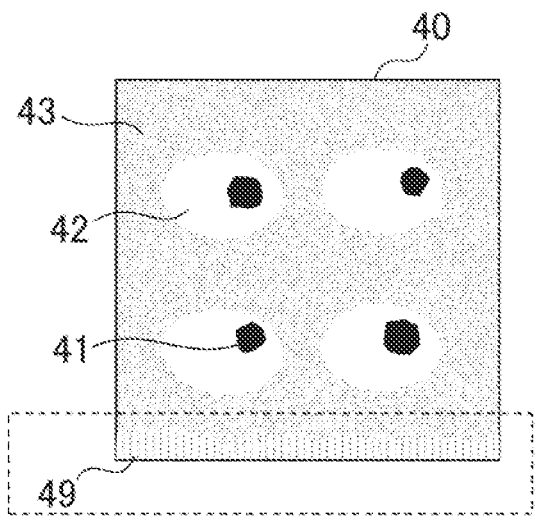
FIG. 3 is a diagram illustrating an example of a region-segmented image.

(ii) The training data 14 is constituted by a region-segmented image calculated from each image 30 included in the sample image 13. FIG. 3 is a diagram illustrating an example of the region-segmented image. In FIG. 3, in a region-segmented image 40, a label 41 indicating a first measurement target, a label 42 indicating a second measurement target, and a label 43 indicating a background are assigned to each pixel in the image 30. Each of the first measurement target corresponding to the label 41 and the second measurement target corresponding to the label 42 is a portion to be subjected to the overlay measurement and corresponds to, for example, a via, a trench, or another structure in the semiconductor. How the structure in the semiconductor is defined is determined in advance according to the operation of the overlay measurement. An additional label other than the labels 41, 42, and 43 may be assigned to the region-segmented image 40. For example, in FIG. 3, a label 49 corresponding to an invalid region to be excluded by the learning unit 2 is assigned to the region-segmented image 40.

Figure 4:
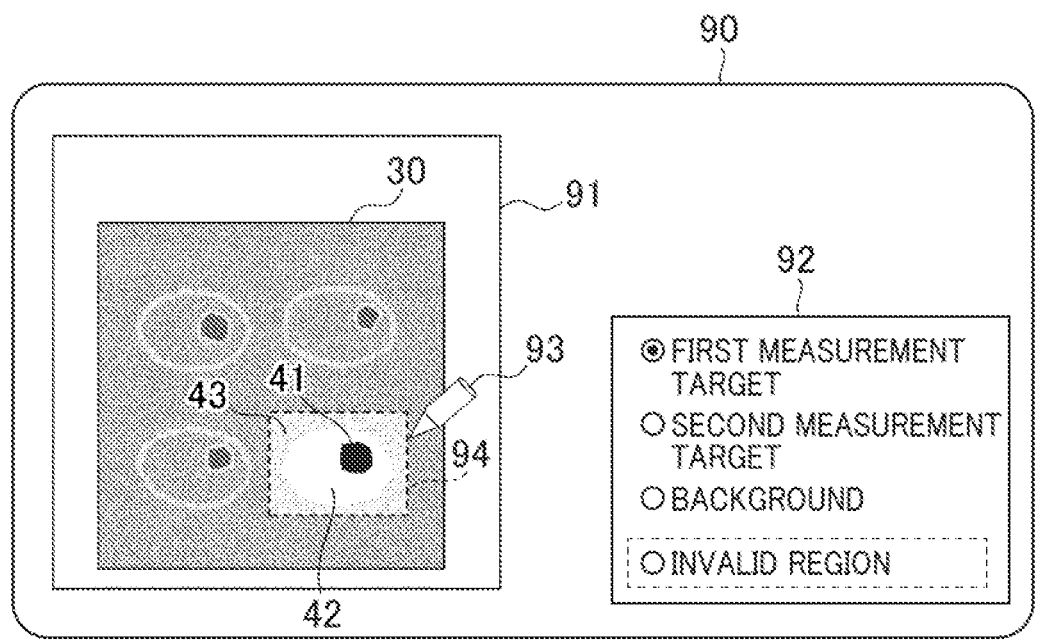
FIG. 4 is a diagram illustrating an example of a configuration of a user interface provided by a training data generator 1 and configured to generate training data 14 from a sample image 13.

(iii) FIG. 4 is a diagram illustrating an example of a configuration of the user interface provided by the training generation unit 1 and configured to generate the training data 14 from the sample 13. In FIG. 4, the user interface includes, for example, a main screen 90, an input screen 91, an input selection region 92, and an input pen 93. In a state in which an operator selects any of items from radio buttons of input selection 92 on the input screen 91, by operating the input pen 93 on the image 30 (for example, filling a region designated for a label), the label is assigned to the region operated by the input pen. In the input selection 92, the labels 41, 42, and 43 are selected according to the selection of the items of the radio buttons for the first measurement target, the second measurement target, and the background. A predetermined color or gradation is assigned to the region operated by the input pen 93 according to the label selected in the input selection 92.

The input selection 92 may include an item that enables an additional label for the invalid region 49 or the like to be selected. The user interface in the input selection 92 is an example, and character strings given for the radio buttons may be changed and a user interface other than the radio buttons may be provided. A region 94 for selection indicates an example in which the labels 41, 42, and 43 are assigned to a portion of the image 30. The region-segmented image 40 is generated by assigning similar labels to all regions of the image 30.

By using the aforementioned training generation unit 1, the operator can generate the training data 14 from the sample image 13 with a simple operation without parameter adjustment for which know-how is required and without reference to a design diagram.

Figure 5:
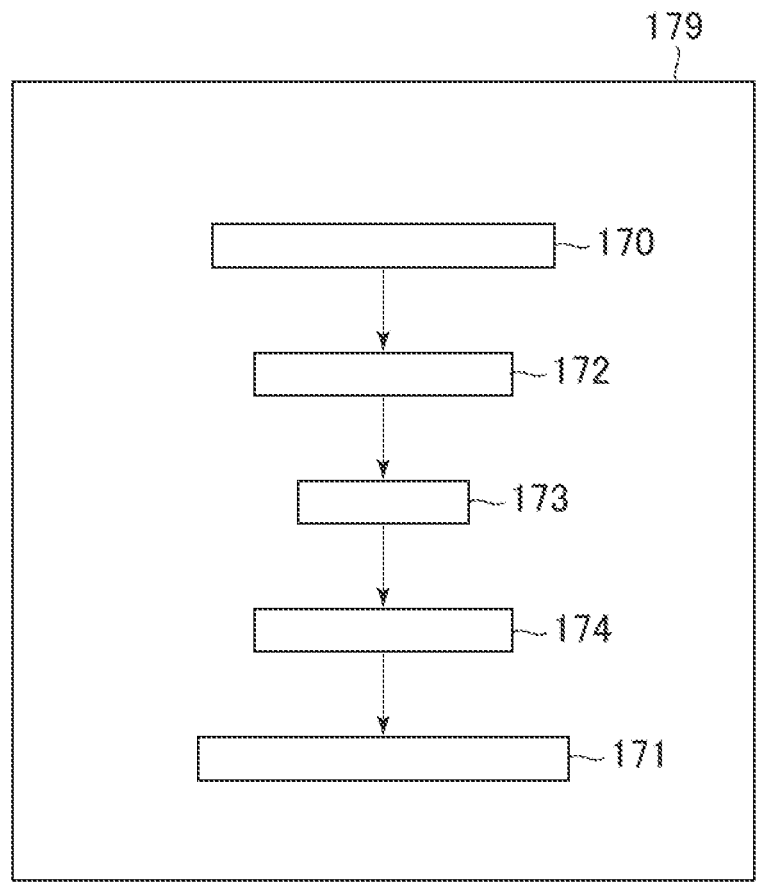
FIG. 5 is a diagram illustrating an example of a deep neural network structure 179 in a learning model 11.

(iv) FIG. 5 is a diagram illustrating an example of a deep neural network structure 179 in the learning model 11. The deep neural network structure 179 can be constituted by, for example, an input layer 170, an output layer 171, and a plurality of intermediate layers 172, 173, and 174.

The image 30 is stored in the input layer 170. From the input layer 170 to the intermediate layer 172 and from the intermediate layer 172 to the intermediate layer 173, data is aggregated in the layers by a convolution operation by a predetermined coefficient filter and image reduction. On the other hand, from the intermediate layer 173 to the intermediate layer 174 and from the intermediate layer 174 to the output layer 171, the data is expanded in the layers by a convolution operation by a predetermined coefficient filter and image enlargement. This network structure is generally called a convolution neural network. The data in the output layer (last layer) 171 indicates a likelihood for each label in the region-segmented image 40. By assigning a label with the maximum likelihood to each pixel, the region-segmented image 40 can be calculated. The learning model 11 corresponds to coefficients of the filters in the intermediate layers. The deep neural network structure 179 is an example of a network structure in the learning model 11, and the number of intermediate layers such as 172 is not limited to three illustrated in FIG. 5. An additional structure such as a bypass structure coupling the intermediate layer 172 to the intermediate layer 174 can be provided or an additional operation added to a filtering operation can be added. When an additional parameter is added with the addition of the additional structure or the additional operation to the network structure in the learning model 11, the additional parameter is also added to the learning model 11.

Figure 6:
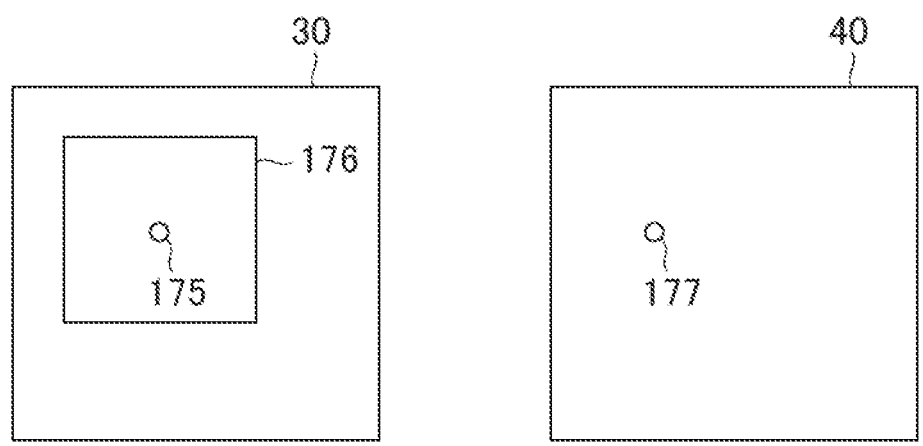
FIG. 6 is a diagram for supplementarily explaining a geometrical relationship between the neural network structure 179 and an image.

(v) FIG. 6 is a diagram for supplementarily explaining a geometrical relationship between the neural network structure 179 and an image. In FIG. 6, attention is paid to a pixel 175 in the image 30 and a pixel 177 whose coordinates are the same as those of the pixel 175 in the region-segmented image 40. In this case, in the input layer 170, a region that is in the vicinity of a predetermined range of the pixel 175 and is called a receptive field 176 (the receptive field is an image range involved in the determination of a label and the size of the receptive field is determined according to the neural network structure 179) is involved. Data of the intermediate layers 172, 173, and 174 is calculated by the convolution operations, the image enlargement, and the image reduction from data of the receptive field 176 in the input layer 170, and a label of the pixel 177 is defined in the output layer 171. Actually, a label of each pixel in the region-segmented image 40 is efficiently calculated by parallel computing from each pixel in the image 30.

The learning unit 2 refers to the sample image 13 and the training data 14 and calculates a parameter of the learning model 11 for inferring the region-segmented image 40 when the image 30 is given. Specifically, the learning unit 2 infers the region-segmented image 40 from the image 30 in the sample image 13, compares the inferred region-segmented image 40 with the region-segmented image 40 corresponding to the image 30 in the training data 14, and calculates the learning model 11 in which the difference between the region-segmented images 40 is optimal and minimal. For example, the difference between the region-segmented images 40 is treated as the number of pixels for which labels are different among all pixels of the images, and a partial derivative for each component in the learning model 11 (neural network structure 179) with respect to the number of pixels is calculated. There is a method for sequentially adding a value obtained by multiplying a predetermined negative coefficient by the partial derivative for each component in the learning model 11 to perform an update (perform an update gradually such that the number of pixels is reduced) for each image 30 in the sample image 13. However, the present disclosure is not limited to this method. When the label 49 (invalid region) is included in the corresponding region-segmented image 40 in the training data 14, that portion is excluded from the total number of pixels with different labels.

Furthermore, the learning unit 2 may add random noise to the image 30 in the sample image 13 at the time of the generation of the learning model 11 and may add, to the image 30 in the sample image 13, a synthesized image subjected to a synthesis process such as geometric transform that is enlargement, reduction, left-right inversion, top-bottom inversion, and the like. The learning unit 2 can calculate the learning model 11 from a sufficient number of images 30 by adding the synthesized image.

Figure 7:
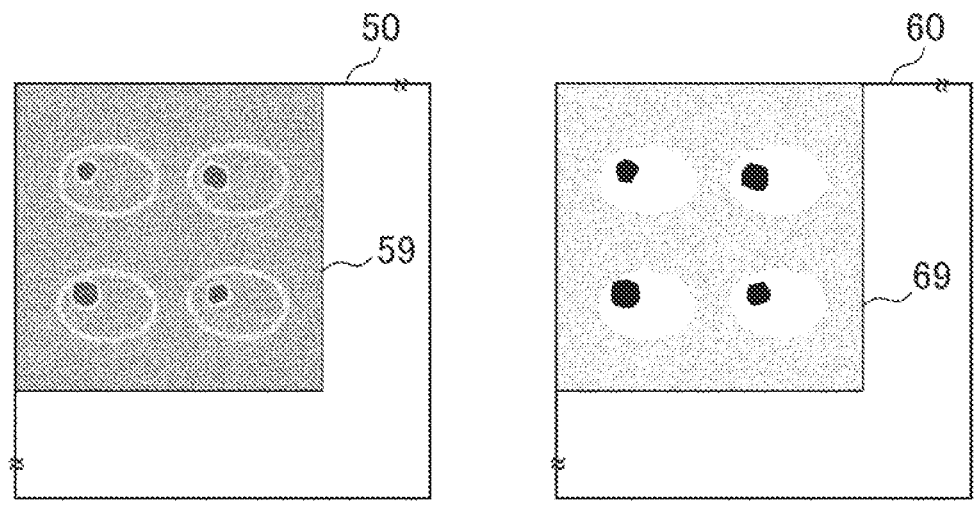
FIG. 7 is a diagram illustrating an image 50 that is an example of an input image 12.

(vi) The input image 12 is an image captured at the time of the overlay measurement. FIG. 7 is a diagram illustrating an image 50 that is an example of the input image 12. A region 59 in the image 50 illustrated in FIG. 7 has dimensions that are the same as or close to those of the image 30 in the sample image 13, and includes a structure of the semiconductor to be subjected to the overlay measurement. The structure of the semiconductor to be subjected to the overlay measurement is periodically displayed outside the region 59 of the image 50, like the region 59.

The region segmentation unit 3 refers to the learning model 11 and infers a region-segmented image 60 illustrated in FIG. 7 from the input image 12. A region 69 in the region-segmented image 60 is in the same range of the region 59. In this case, the inference means that data is input to the network structure of the learning model 11, calculation such as the convolution operation in each of the layers (input layer 170, output layer 171, and intermediate layers 172, 173, and 174) is performed, and a result of the calculation is acquired. Any of the labels 41, 42, and 43 is assigned to each pixel of the region 69 in the region-segmented image 60, like the region-segmented image 40. When the image of the region 59 is similar to any of the images 30 in the sample image 13, the learning model 11 has the property of inferring the region-segmented image 40 corresponding to the image 30 in a process of calculating the learning model 11 by the learning unit 2. Therefore, an accurate label can be assigned to the region 69. The same applies to a remaining region other than the region 69 in the region-segmented image 60. The measure (criterion) of the "similarity" (criterion) means that internal images are similar in units of receptive fields 176 (small regions in each image 30). Particularly, in the overlay measurement, the structure of the semiconductor to be measured is periodical. Therefore, even when dimensions of an image in the sample image 13 are smaller than those of the region-segmented image 60, it can be expected that an image 30 that satisfies a requirement for a similarity to the region-segmented image 60 is present in the sample image 13 and an accurate label is assigned.

(vii) The grouping unit 4 performs a process shown in a flowchart of FIG. 9 to group a portion included in the region-segmented image 60 and to be subjected to the overlay measurement into small regions. The grouping process is described later in detail.

Figure 11:
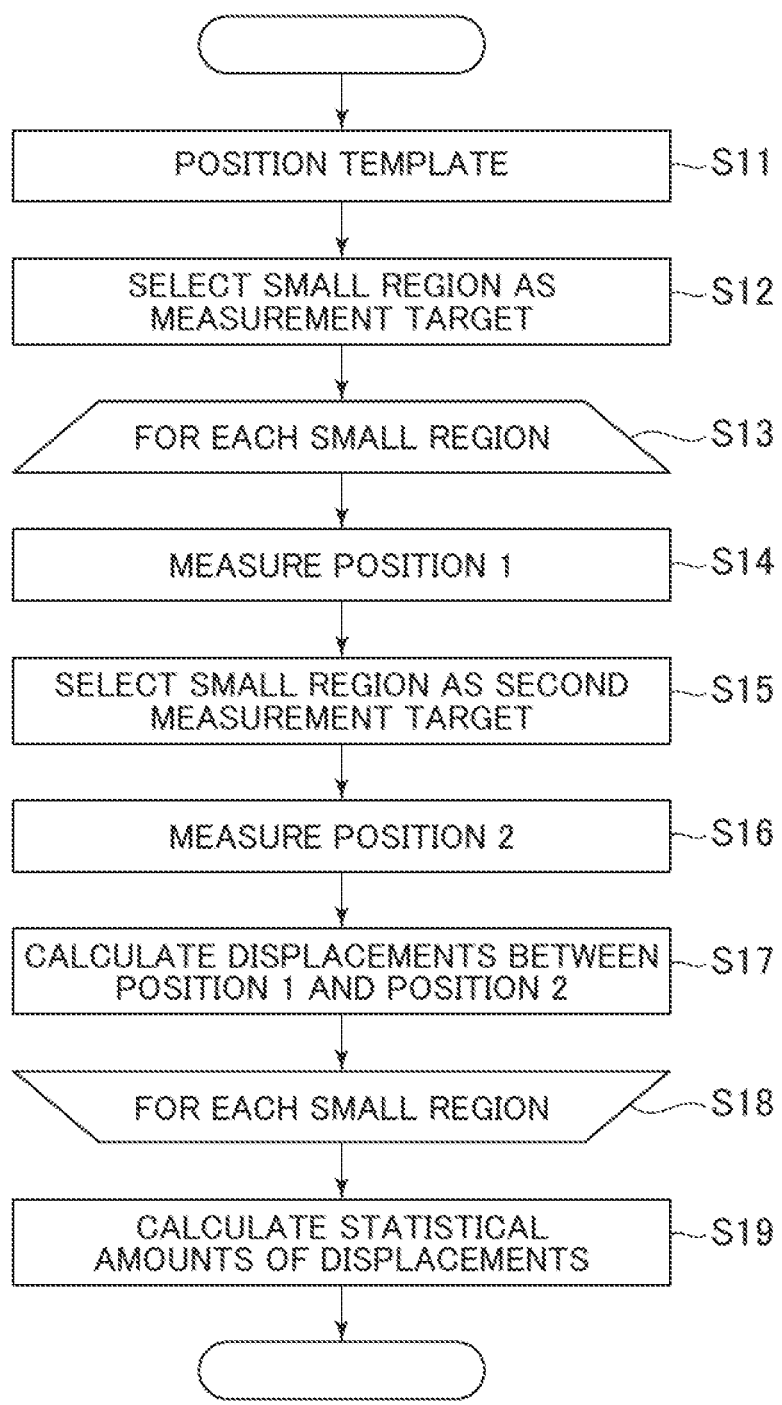
FIG. 11 is a flowchart for explaining details of an overlay measurement process to be performed by an overlay measurement unit 5.

(viii) The overlay measurement unit 5 performs a process shown in a flowchart of FIG. 11 to perform the overlay measurement from a grouped image 70. The overlay measurement process is described later in detail.

<Details of Grouping Process>

FIG. 9 is a flowchart for explaining details of the grouping process to be performed by the grouping unit 4. The grouping process is to group a region into small regions according to labels assigned to a predetermined region of the region-segmented image 60 in accordance with items of the measurement targets specified in a table 80 of FIG. 10.

The grouping unit 4 repeatedly performs processes of steps S2 and S3 for each item of the measurement targets (first measurement target and second measurement target) specified in the table 80 of FIG. 10 in steps S1 to S4.

In step S2, the grouping unit 4 calculates a binary image in which pixels of target labels in the region-segmented image 60 are 1 and other pixels are 0. According to FIG. 10, the target labels are the label 41 for the first measurement target and the labels 41 and 42 for the second measurement target. The reason why the plurality of labels is specified for the second measurement target is that a structure corresponding to the label 41 is present on the front side with respect to a structure corresponding to the label 42 in the image 50 and thus a portion of the label 42 is occluded by the label 41 in the region-segmented image 60.

In step S3, the grouping unit 4 groups the binary image obtained in step S2 into small regions. As the method for grouping into small regions, a method that is called labeling for grouping into coupled regions of pixels with a value of 1 in a binary image is applicable. However, the method is not limited to the labeling, and another method capable of grouping into small regions is applicable.

Figure 8:
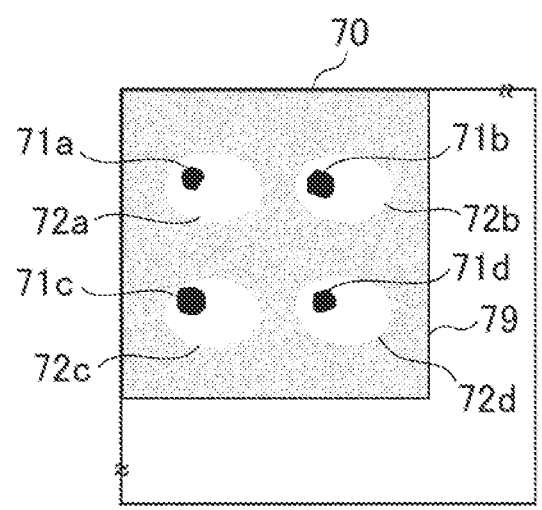
FIG. 8 is a diagram illustrating an example of output of a grouping unit 4.

The grouping process is performed in the aforementioned manner. FIG. 8 is a diagram illustrating an example of the output of the grouping unit 4. In FIG. 8, an image 70 indicates an example of a grouped image calculated by the grouping process (FIG. 9). Small regions 71a, 71b, 71c, and 71d correspond to the first measurement target indicated in the table 80. In addition, small regions 72a, 72b, 72c, and 72d correspond to the second measurement target indicated in the table 80. A region 79 in the grouped image 70 is in the same range as that of the region 59 (see FIG. 7). For example, for a semiconductor pattern, a small region that is the same as or similar to the region 59 repeatedly appears outside the region 50 in the region-segmented image 60 (see FIG. 7). That is, for a semiconductor pattern, a similar pattern repeatedly appears, and thus training data do not need to be generated for all pixels in the image. For example, when training data for a receptive field 176 (see FIG. 6) that is a small region is obtained, it is possible to build a learning model capable of inferring an entire image of a region larger than the receptive field 176, and it is possible to save the time and effort of the operator.

<Details of Overlay Measurement Process>

FIG. 11 is a flowchart for explaining details of the overlay measurement process to be performed by the overlay measurement unit 5.

(i) Step S11

The overlay measurement unit 5 positions a template for the first measurement target. The template is X and Y coordinates of each component of the first measurement target and is data prepared for the operation of the overlay measurement in advance. FIG. 12 is a diagram illustrating an example of a configuration of template data 85. In FIG. 12, the template data 85 is constituted by X and Y coordinates of each of first to N-th components. The template data 85 is calculated from X and Y coordinates of the centers of gravity of the small regions 71a, 71b, 71c, 71d, and the like in the grouped image 70 as a representative example. Alternatively, the template data 85 may be calculated from a design diagram for the semiconductor or the like.

As a criterion for the positioning, the positioning is performed such that the centers of gravity of all points in the template match the centers of gravity of the small regions 71a and the like of the first measurement target, but the positioning is not limited to this method.

(ii) Step S12

The overlay measurement unit 5 selects the small regions 71a and the like corresponding to the aligned components in the template data 85. As a criterion for the selection of a small region that is among the small regions 71a and the like and whose center of gravity is the closest to a component of the template data 85 can be selected, but the selection is not limited thereto.

(iii) Steps S13 to S18

The overlay measurement unit 5 repeatedly performs processes of steps S14 to S17 for each small region selected in step S12. In the following description, the case where the small region 71a is a target is described as an example.

(iii-1) Step S14

The overlay measurement unit 5 calculates a position 1 that is a representative position of the first measurement target. The position 1 is defined by two components, an X coordinate X1 and a Y coordinate Y1. The position 1 is calculated from X and Y coordinates of the position of the center of gravity of the small region 71a or the like.

(iii-2) Step S15

The overlay measurement unit 5 selects, from among small regions of the second measurement target, the small region 71a and a region for which an overlay amount is calculated. As a criterion for this selection, a criterion for selecting a region whose center of gravity is the closest can be applied. In FIG. 8, for example, the small region 72a is selected.

(iii-3) Step S16

The overlay measurement unit 5 calculates a position 2 that is a representative position of a small region (for example, the small region 72a) of the second measurement target selected in step S15. The position 2 is defined from two components, an X coordinate X2 and a Y coordinate Y2.

(iii-4) Step S17

The overlay measurement unit 5 calculates, from the positions 2 and 1, Dx and Dy that are displacements of X and Y coordinates according to the following Equations 1 and 2.

$$Dx = X2 - X1 \quad \text{(Equation 1)}$$

$$Dy = Y2 - Y1 \quad \text{(Equation 2)}$$

(iv) Step S19

The overlay measurement unit 5 calculates statistical amounts of displacements of Dx and Dy calculated based on Equations 1 and 2. For the calculation of the statistical amounts, an arithmetic average can be used, but the present disclosure is not limited thereto and a geometric mean or a median value may be used. The overlay measurement unit 5 uses the statistical amounts of the displacements calculated in step S19 as an overlay amount of the image 50.

Technical Effects of Example 1

According to Example 1, the process of calculating the learning model 11 by the learning unit 2 using the training data 14 generated from the sample image 13 in the training generation unit 1 in advance is provided. Since the region segmentation unit 3 refers to the learning model 11 and uses the region-segmented image 60 calculated from the input image 12, the grouping unit 4 and the overlay measurement unit 5 can measure the overlay amount. Therefore, it is possible to accurately perform the overlay measurement by inferring the region-segmented image 60 without the need of performing parameter adjustment for which know-how is required, unlike Patent Literature 1, and without the need of the design data of the input image 12, unlike Patent Literature 2. In addition, intermediate process data such as the region-segmented image 60 and the grouped image 70 can be visualized. Therefore, unlike Patent Literature 3, when an unexpected overlay amount is measured, the cause can be recognized by displaying the intermediate process data on a screen. That is, since the region segmentation unit 3 refers to the learning model 11 and segments the input image 12, the aforementioned first and second problems are solved. In addition, since the region-segmented image is data that can be visualized, the operator can easily confirm the data. Therefore, the third problem can be solved.

In addition, according to Example 1, the learning model 11 infers the region-segmented image 40 in units of receptive fields 176. Furthermore, in the overlay measurement process, the input image 12 (image 60: see FIG. 7) includes the periodical structure in the semiconductor. Therefore, dimensions of the image 30 in the sample image 13 to which the training data 14 is assigned using a user interface of the main screen 90 in the training generation unit 1 are smaller than those of the image 60 in the input image 12. This can reduce the number of processes of assigning the training data 14 by the operator.

Modification of Example 1

In the aforementioned Example 1, the constituent components can be changed. For example, as the learning model 11, any machine learning model that infers the region-segmented image 40 from the image 30 in units of receptive fields 176 can be applied. For example, a linear discriminator that defines the label of the pixel 177 from all pixels of the receptive field 176 of the image 30 may be used.

In step S16, the X coordinate X2 and the Y coordinate Y2 of the position 2 may be calculated from small regions with different labels. For example, when a table 81 illustrated in FIG. 13 is referenced, the overlay measurement unit 5 calculates the coordinate X2 from the small regions of the labels 41 and 42 and calculates the coordinate Y2 from a small region of a label 44 (label assigned to a predetermined structure in the semiconductor not illustrated in the example of the region-segmented image 40 illustrated in FIG. 3) in step S16. The accurate coordinate Y2 may not be calculated from the small regions with the labels 41 and 42 since the contour (contrast) in a vertical direction of the structure included in the semiconductor and corresponding to the label 42 is not clear. In this case, in FIG. 3, the accurate coordinate Y2 is calculated by adding the label 44 (for example, a label 42b illustrated in FIG. 15 in Example 2) assigned to the structure in which contrast (horizontal stripes) in the vertical direction is clear. That is, when the contrast in the vertical direction of the structure included in the semiconductor and corresponding to the label 42 is not clear, it is possible to calculate the accurate coordinate Y2 by changing to the label 44 to which a target to be subjected to the overlay measurement is newly assigned.

In addition, when the table 81 is referenced in step S16, the training generation unit 1 adds the label 44 to targets to which labels are to be assigned, as compared with the case where the table 80 is referenced in step S16. The region segmentation unit 3 adds the label 44 to targets to be inferred, and the grouping unit 4 adds the label 44 to targets to be grouped. Similarly, in step S14, the coordinates X1 and Y1 of the position 1 may be calculated from small regions with different labels.

The process of step S11 is general as the overlay measurement but may be excluded. In this case, in step S12, all the small regions 71a and the like in the grouped image 70 are selected. Alternatively, in step S12, a small region having a small area similar to noise may be additionally selected from among the small regions 71a and the like.

(3) Example 2

<Example of Functional Configuration>

Figure 14:
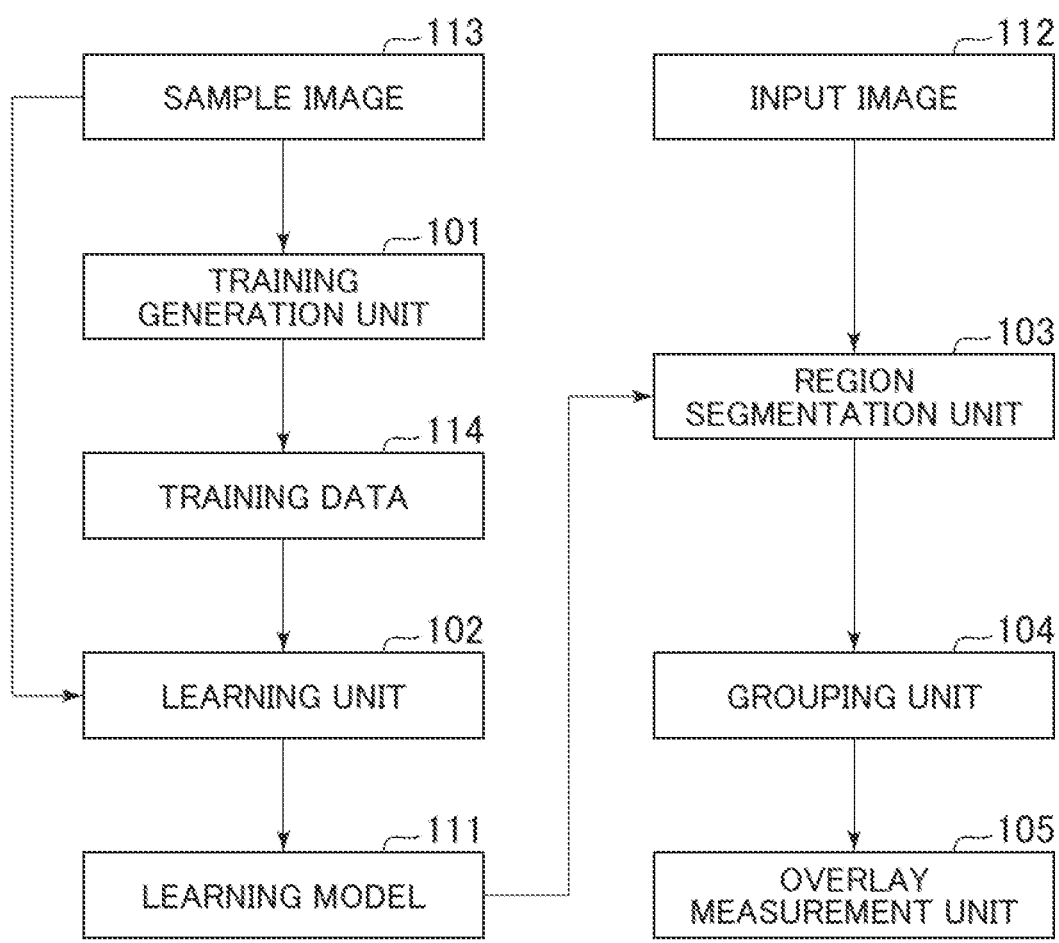
FIG. 14 is a diagram illustrating an example of a functional configuration from training data generation to overlay measurement according to Example 2.

FIG. 14 is a diagram illustrating an example of a functional configuration from training data generation to overlay measurement according to Example 2. In FIG. 14, a sample image 113 is, for example, a pair of images obtained by imaging the same position on the semiconductor wafer a plurality of times while changing imaging conditions. The imaging conditions are an acceleration voltage of the electronic microscope, the capturing of a reflected electron image and a secondary electron image, an image synthesis ratio when both images are synthesized, and the like, but are not limited thereto.

Figure 15:
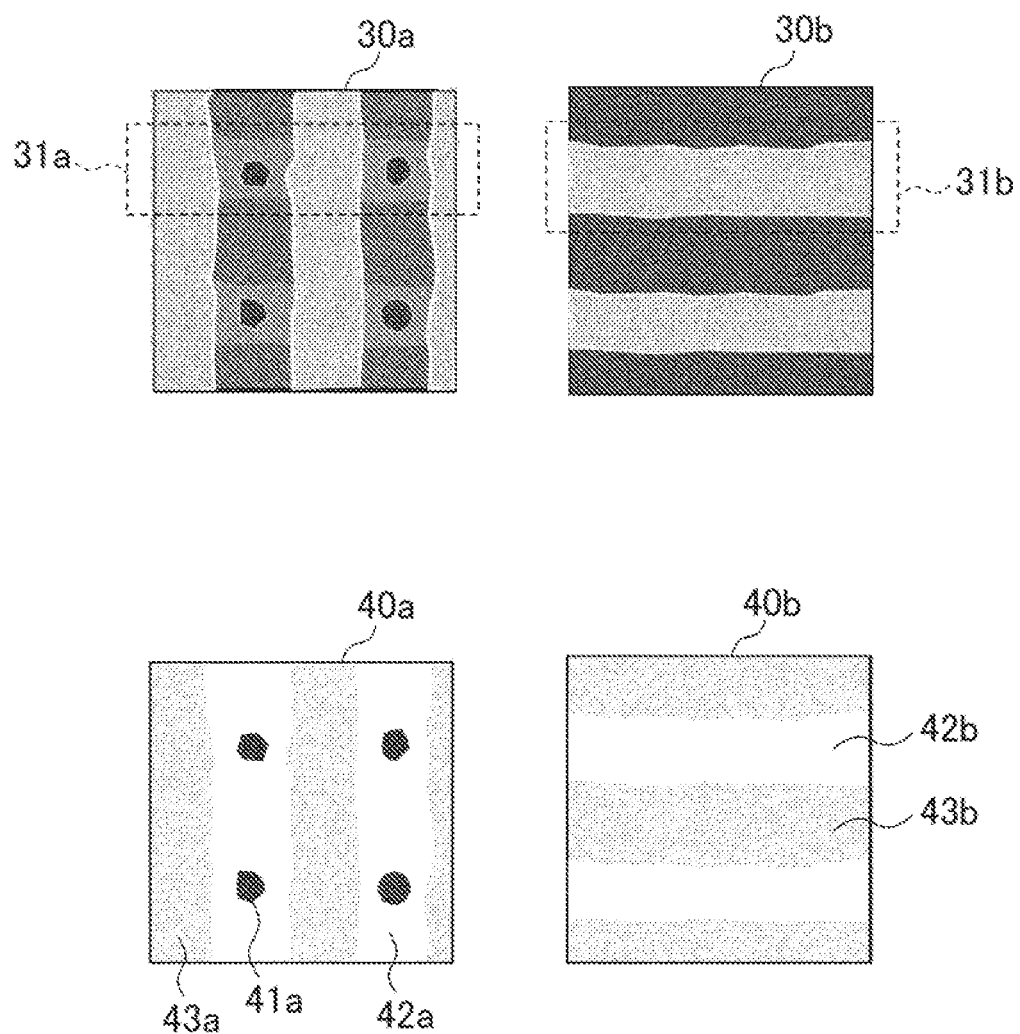
FIG. 15 is a diagram illustrating an example of a pair of sample images 30a and 30b and region-segmented images (training data to which labels are assigned) 40a and 40b.

FIG. 15 is a diagram illustrating an example of a pair of sample images 30a and 30b of the sample image and region-segmented images (training data to which labels are assigned) 40a and 40b. The image 30a has a structure horizontally long in a region 31a, but contours (contrast in the vertical direction) of upper and lower portions thereof are not clear. On the other hand, the image 30b includes an image of a region 31b at the same position as the region 31a. The image 30b has a structure in which contours of upper and lower portions are clear.

In the overlay measurement process, a multi-layer semiconductor is to be imaged, depths at which multiple layers are in focus are different as viewed from the electronic microscope, and imaging conditions that cause the clearest image differs for each layer. Therefore, a clear image may be acquired from all structures in images obtained by performing imaging a plurality of times while changing imaging conditions. The training generation unit 1 assigns labels to the pair of images in the sample image 113, generates training data 114, and provides a user interface therefor. Training data 40a and 40b illustrated in FIG. 15 is an example of the training data 114 and is a pair of region-segmented images to which labels 41a, 42a, 43a, 42b, and 42c are assigned in the images 30a and 30b.

The learning unit 102 calculates a learning model 111 from the sample image 113, the training data 114, the pair of images 30a and 30b, and the pair of region-segmented images 40a and 40b. The learning model 111 includes a neural network structure for inferring the region-segmented image 40a from the image 30a and a neural network structure for inferring the region-segmented image 40b from the image 30b. The neural network structures may be two neural network structures completely independent of each other or may be neural network structures that share a portion such as an intermediate layer 173 or the like.

The input image 112 is a pair of images captured under the same imaging condition as that of the sample image 113 or under a similar imaging condition to that of the sample image 113. The region segmentation unit 103 outputs a pair of region-segmented images having the same configuration as that of the pair of region-segmented images 40a and 40b from the input image 112. The grouping unit 104 performs computation to calculate, from the pair of region-segmented images output from the region segmentation unit 103, small regions to which three types of labels, the label 41a, the labels 41a and 42a, and the label 42b are assigned.

The overlay measurement unit 105 calculates the position 1 from the label 41 in step S14 illustrated in FIG. 11, calculates the X coordinate (X2) of the position 2 from the labels 41a and 42a in step S16, and calculates the Y coordinate (Y2) from the label 42b to measure the overlay amount.

Technical Effects of Example 2

In Example 2, according to the aforementioned configuration, even when it is difficult to accurately perform the overlay measurement under a single imaging condition, a combination of images obtained by imaging the same position under a plurality of imaging conditions is used. Therefore, the labels inferred by the region segmentation unit 103 are accurate, and the overlay measurement unit 105 can accurately perform the overlay measurement. In addition, since the training generation unit 101 assigns a label to a clear portion in the sample image 113, the training generation unit 101 can accurately assign a label to a small region and generate the training data 114.

(4) Example 3

Example 3 discloses a technique for narrowing down targets to which labels are assigned to a portion of a sample image to reduce the amount of an operation of assigning labels in training data by an operator.

<Overview of Functional Configuration>

Figure 16:
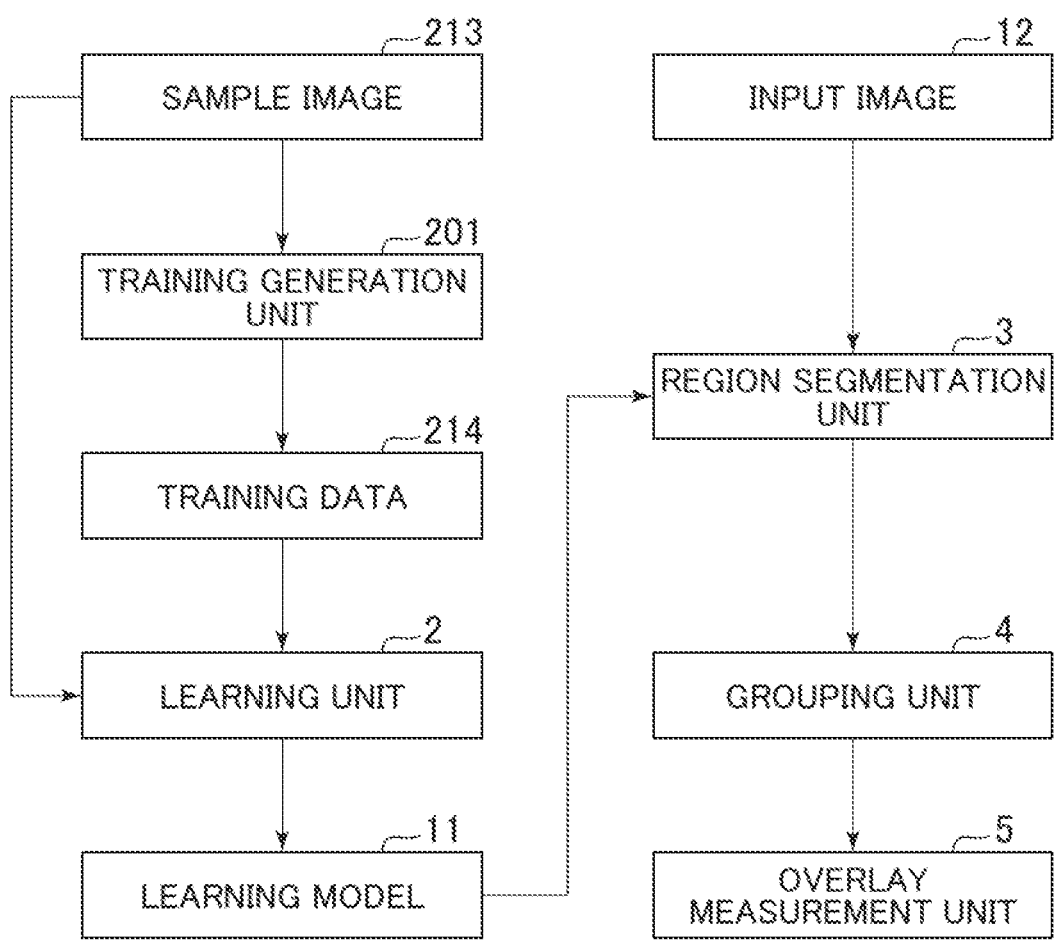
FIG. 16 is a diagram illustrating an example of a functional configuration from training data generation to overlay measurement according to Example 3.

FIG. 16 is a diagram illustrating an example of a functional configuration from training data generation to overlay measurement according to Example 3. First, an overview of the example of the functional configuration according to Example 3 is described.

A training generation unit 201 learns an intermediate learning model from a region-segmented image group 241 in which a label is assigned to an image group 231 that is a subset in a sample image 213 (that is, a label is assigned to each of images 30 in the image group 231). In this case, the reason why the expression "intermediate learning model" is used is that the model is a learning model for generating the region-segmented imager group 241 from the image group 231 (subset of the sample image 213) and is not the last learning model for generating a region-segmented image from the input image 12.

The training generation unit 201 refers to the intermediate learning model, infers the region-segmented image group 243 from a remaining sample image 233, and performs a process of correcting the region-segmented image group 243. Alternatively, a user interface for the correction is provided. The functions of the learning unit 2, the region segmentation unit 3, the grouping unit 4, and the overlay measuring unit 5, and data of the learning model 11 and the input image 12 are common to Example 1, and a description thereof is omitted.

<Details of Training Generation Process>

Figure 17:
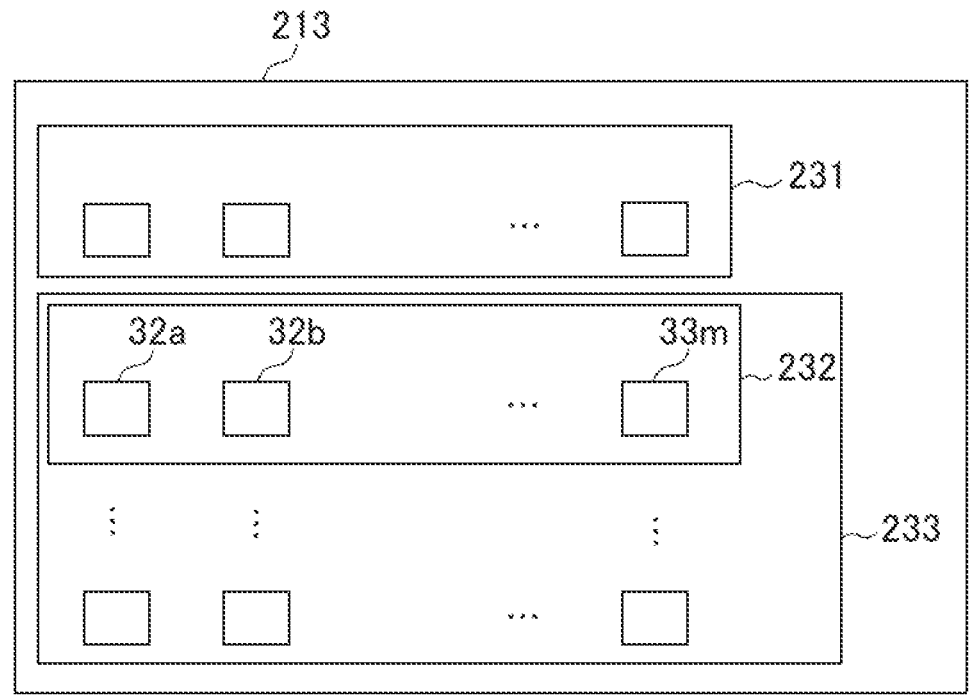
FIG. 17 is a diagram illustrating an example of a configuration of a sample image 213.
Figure 18:
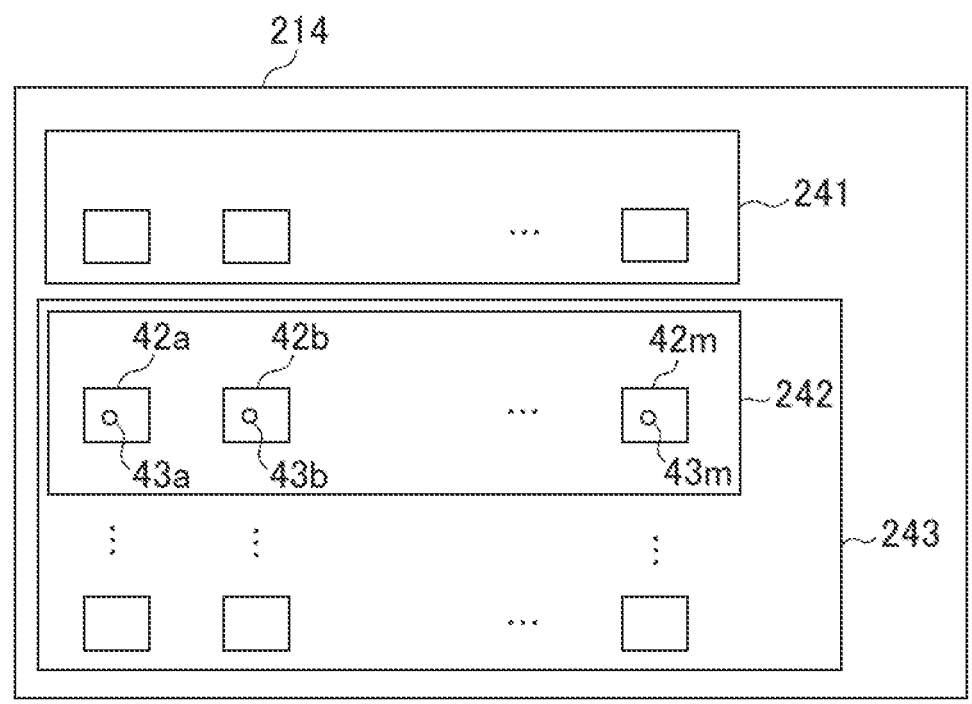
FIG. 18 is a diagram illustrating an example of a configuration of training data 214.
Figure 19:
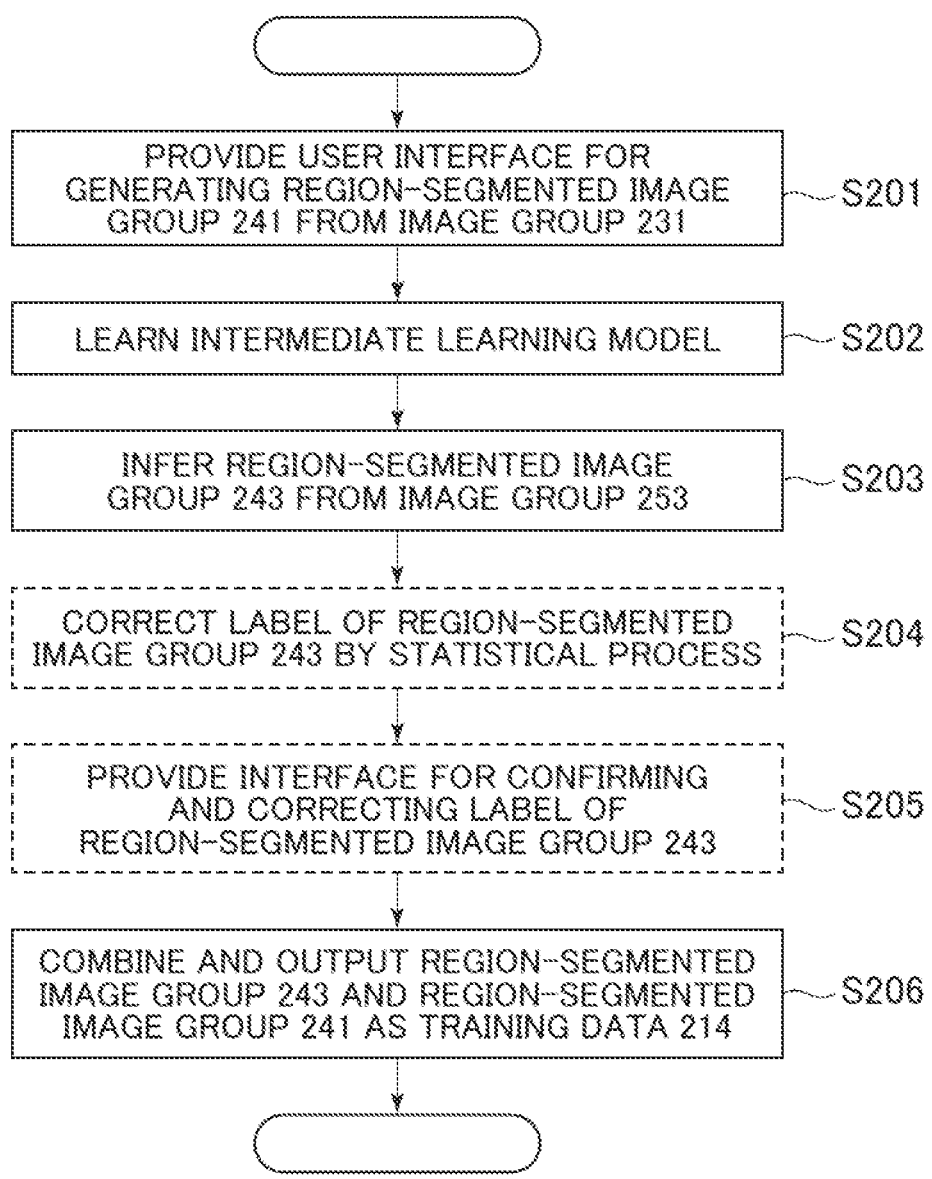
FIG. 19 is a flowchart for explaining a training data generation process by a training generation unit 201.

A training generation process is described in detail with reference to FIGS. 17 to 19. FIG. 17 is a diagram illustrating an example of a configuration of the sample image 213. FIG. 18 is a diagram illustrating an example of a configuration of training data 214. FIG. 19 is a flowchart for explaining the training generation process by the training generation unit 201.

(i) Step S201

As illustrated in FIG. 17, the sample image 213 is segmented into subsets of the image groups 231 and 233 in advance.

In step S201, the training generation unit 201 provides, to the operator, a user interface (main screen 90: see FIG. 4) for generating the region-segmented image group 241 illustrated in FIG. 18, responds to input of the operator, and assigns a label to the image group 231.

(ii) Step S202

The training generation unit 201 calculates the intermediate learning model (learning model for generating the region-segmented image group 241 from the image group 231) from the image group 231 and the region-segmented image group 241 in accordance with the same procedure as that of the learning unit 2.

(iii) Step S203

The training generation unit 201 refers to the intermediate learning model calculated in step S202 and infers the inside of the region-segmented image group 243 from the image group 233 (more precisely, the training generation unit 201 calculates the region-segmented image group 243 by inferring the region-segmented image group 40 from each of the images 30 in the imager group 233).

(iv) Step S204

Since it is difficult for the image group 231, which is the subset of the sample image, to completely cover characteristics of all the images included in the image group 233, an incorrect label is included in the region-segmented image group 243 in most cases. Therefore, the training generation unit 201 corrects a label in the region-segmented image group 243 based on a statistical process. As the correction based on the statistical process, for example, it is possible to perform correction to obtain the mode value of the label in a subset that is included in the region-segmented image group 243 and obtained by repeatedly imaging the same imaging position on a semiconductor chip.

In this case, images 32a and 32b to 32m (m is any number) in an image group 232 that is a subset included in the image group 233 illustrated in FIG. 17 are images obtained by repeatedly imaging the same position on the semiconductor chip. In this case, in step S204, a label with the mode value is assigned by the correction for obtaining the mode value to all region-segmented images 42a and 42b to 42m in the region-segmented image group 242 inferred from the image group 232. In addition, when attention is paid to pixels 43a and 43b to 43m at the same coordinates in the region-segmented images 42a and 42b to 42m, a label that appears most frequently among the pixels before the correction is assigned by the correction for obtaining the mode value after the correction. By the correction for obtaining the mode value, it is possible to correct a change in a label of the region-segmented image 40 due to the image quality of the image 30 and noise superimposed when the same position is repeatedly imaged.

When imaging positions of the images 32a and 32b to 32m in the image 232 are slightly shifted, positioning may be performed in advance. The positioning is to calculate a displacement between the images 32b to 32m and the image 32a and move the images 32b to 32m by the displacement in parallel but may be performed using a method other than this method. Regarding the displacement between the image 32b and 32a among displacements between the images, when the image 32b is moved in parallel based on the displacement, the displacement between the image 32b and the image 32a can be calculated under a condition that causes the sum of differences between luminescence of each pixel of the image 32b and luminescence of each pixel of the image 32a is smallest. When the region-segmented image 42b is moved in parallel based on the displacement, the displacement can be calculated under a condition that causes the number of pixels in which labels do not match between the region-segmented images 42b and 42a is smallest. The target from which the displacements between the images are calculated may not be the top image 32a.

(v) Step S205

The training generation unit 201 provides a user interface for the operator to confirm whether a label assigned in the region-segmented image group 233 is accurate. The user interface displays each of the region-segmented images 40 constituting the region-segmented imager group 243. In this case, to easily determine whether labels assigned to the region-segmented images 40 are appropriate, the images 30 included in the image group 233 may be displayed side by side on the user interface provided in step S205 or a blend image through which the region-segmented images 40 are made transparent on the images 30 may be additionally displayed on the user interface. The user interface provided in step S205 may be provided with a function of modifying the labels of the region-segmented images 40 included in the region-segmented image group 243. The function of modifying the labels displays the region-segmented images 40 included in the region-segmented image group 243 or the blend image on an input screen 91 (see FIG. 4) and modifies the displayed labels by an operation of the input pen 93 on the input screen 91.

(vi) Step S206

The training generation unit 201 outputs the region-segmented image group 241 and the region-segmented image group 243 as the training data 214.

Technical Effects of Example 3

According to Example 3, it is possible to use the user interface (main screen 90) provided by the training generation unit 201 to narrow down a target, to which labels are assigned, to the image group 231 that is a subset in the sample image 213 (that is, the image group 233), assign the labels to all the images 30 within the sample image 213, and obtain the training data 214. In Example 1, the learning model 11 obtains more accurate inference results as the number of parameters within the sample image 13 is larger. On the other hand, there is a trade-off with an increase in the amount of an operation by the operator to assign the labels of the training data 14. However, according to Example 3, the aforementioned trade-off can be eliminated by reducing the amount of an operation of assigning the labels. Particularly, in the overlay measurement, a structure that repeatedly appears in a semiconductor image is usually subjected to the overlay measurement. Therefore, even when parameters of the image group 231 are largely narrowed down, it can be expected that the accuracy of the inference result in step S203 will rarely decrease to the extent that the correction based on the statistical process in step S204 and the correction using the user interface in step S205 are difficult. According to Example 3, reducing the amount of the operation is considered to be effective.

In addition, when the correction based on the statistical process is performed in step S204, the reproducibility of the overlay measurement can be improved. The reproducibility of the overlay measurement is an index of a degree of variation in the overlay amount indicated in the aforementioned Equations 1 and 2 when the same position on the semiconductor wafer is repeatedly imaged. Generally, $3\sigma$ that is three times a standard deviation $\sigma$ is used as the index. The effect of improving the reproducibility of the overlay measurement is that when the correction based on the statistical process is performed in step S204, labels of the region-segmented image group 242 and the like are the same as those of the image group 232 and the like obtained by repeatedly imaging the same position. As a result, when a plurality of images at the same position as the image group 231 on the semiconductor wafer are the input image 12, labels of the region-segmented image 60 inferred by the region segmentation unit 3 from the plurality of images become closer. Therefore, the overlay amount calculated by the overlay measurement unit 5 in S19 becomes almost uniform and the reproducibility of the overlay measurement is improved (becomes small). Since this effect is obtained, the region-segmented image group 241 generated using the user interface provided in step S201 may be subjected to the correction based on the statistical process in step S204.

Modification of Example 3

(i) In a flowchart illustrated in FIG. 19, one of steps S204 and S205 may be excluded. This is due to the fact that the effect of collecting the labels of the region-segmented image group 243 is provided in only step S204 and the effect of confirming and correcting the labels of the region-segmented image group 243 is provided in only step S205.

(ii) In the correction based on the statistical process in step S204, a statistical amount other than the mode value may be used and an additional process other than the obtaining of the mode value may be performed. For example, when the frequency of the mode value is low for labels of pixels at the same coordinates, such as 32a and 32b to 32m, a variation in the labels of the pixels may be large and the label of the invalid region 49 may be assigned.

In the correction based on the statistical process in step S204, a plurality of similar partial regions in the image group 232 may be extracted, instead of using the images in the image group 232 obtained by repeatedly imaging the same position on the semiconductor wafer. The partial regions are partial regions within the images 30, such as the region 94 illustrated in FIG. 4. In addition, the plurality of similar partial regions is a plurality of partial regions having the same dimensions and extracted from one image such as 32a in the image group 232 or a plurality of images such as the plurality of images 32a to 32m on the condition that the similarities are high. In addition, in this case, the similarities can be determined based on correlation values of the brightness of pixels of two images 30 in the partial regions or based on the ratio of pixels with matching labels among pixels in two region-segmented images 40 in the partial regions. Since the semiconductor image to be subjected to the overlay measurement is a repeated pattern, the plurality of similar partial regions can be easily found.

Figure 20:
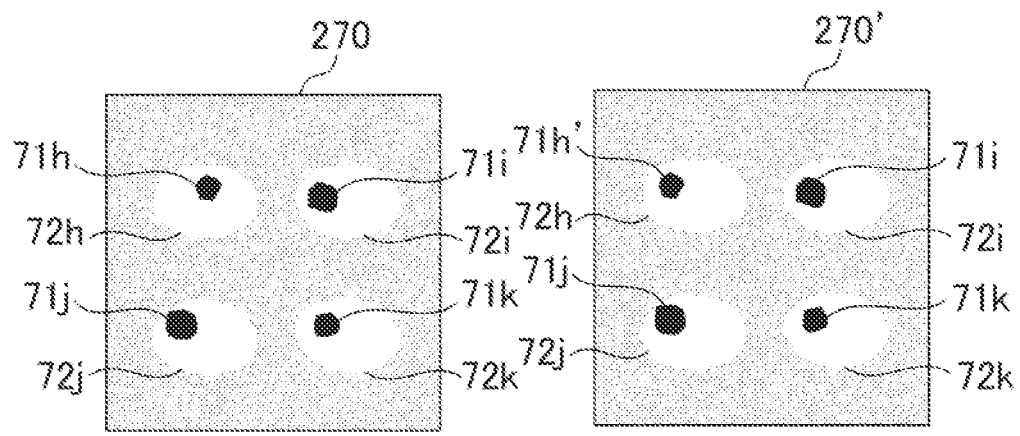
FIG. 20 is a diagram describing an example of correction based on a statistical process in step S204.

(iii) The correction based on the statistical process in step S204 may be correction of the labels within the region-segmented image group 243 in units of small regions. The correction based on the statistical process is described using FIG. 20. FIG. 20 is a diagram for explaining an example of the correction based on the statistical process in step S204. FIG. 20 illustrates an example of a grouped image 270 calculated by the grouping unit 4 from any of the region-segmented images 40 included in the region-segmented image group 243 before the correction, and an example of the grouped image 270' after the correction.

In FIG. 20, a small region 71h is moved to a small region 71h' in parallel by the correction based on the statistical process. An amount by which the small region 71h is moved can be defined such that a displacement (displacement calculated by the method of step S17) between the center of gravity of the small region 71h and 72 and the center of gravity of a small region 72h matches an average of a displacement between the centers of gravity of other small regions 71i and 72i, a displacement between the centers of gravity of other small regions 71j and 72j, and a displacement between the centers of gravity of other small regions 71k and 72k. In the correction in units of small regions, all the small regions such as the small region 71h may be uniformly moved in parallel such that the statistical amounts of the displacements calculated in step S19 become equal to a target value. For example, in a subset that is included in the region-segmented image group 243 and whose imaging position on the semiconductor wafer is the same as that of the grouped image 270, the average value of the statistical amounts of the displacements calculated in step S19 from each component in the subset can be used as the target value. Alternatively, when the semiconductor wafer from which each of the images in the sample image 213 was captured was manufactured (by shifting between predetermined layers of a multilayer semiconductor by an artificial overlay amount) by giving an artificial overlay amount, and the artificial overlay amount is known, the subset may be calculated from an image that is included in the sample image 213 and grouped in the same manner as the image 270 and has the same artificial overlay amount as that of the image 270. In the present specification, the artificial overlay amount may be referred to as a design value of the overlay amount.

Figure 21:
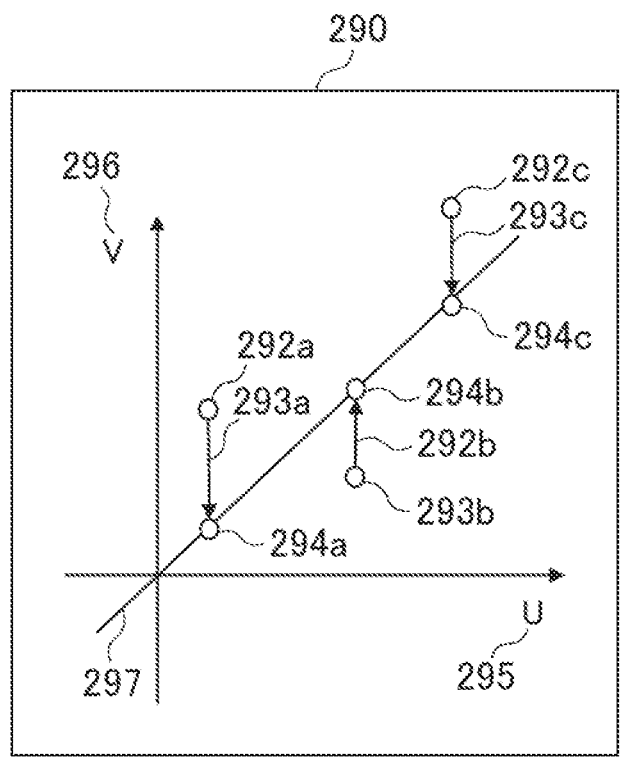
FIG. 21 is a diagram describing another example of the correction based on a statistical process in step S204.

(iv) Furthermore, when the design value of the overlay amount of the image group 233 is known in advance, the target value may be defined such that the sensitivity characteristic of the overlay amount is improved. FIG. 21 is a diagram describing another example of the correction based on the statistical process in step S204. The criterion (criterion for determining the movement amount) when the grouped image 270' after the correction is generated from the grouped image 270 before the correction can be explained based on FIG. 21.

In FIG. 21, for example, a graph 290 in which an X component of the design value of the overlay amount is indicated by a U axis 295 and an X component (Dx in the aforementioned Equation 1) of the overlay amount is indicated by a V axis 296 is considered. In this case, a straight line connecting an ideal value on the V axis 296 to the U axis 295 is indicated by 297 (straight line having a slope of 1 and an intercept of 0, a straight line having a slope of 1 and passing through the centers of gravity of points 292a, 293b, and 293c, a straight line having a predetermined slope changed from the slope of 1, or the like). Then, a point 294a, which is obtained by lowering the point 292a indicating the X component of the overlay amount of the region-segmented image 270 onto the straight line 297, can be treated as the X component of the target value. That is, a vector 293a can be treated as Xb for parallel movement. In addition, in FIG. 21, a target value of the X component of the overlay amount is determined in step S19 for each of all the region-segmented images, which are included in the region-segmented image group 243 and are not 270, such that points 292b and 292c are moved to points 294b and 294c based on vectors 293b and 293c, respectively. By performing this, all X components of overlay amounts in the region-segmented image group 243 are present on the straight line 297 after the parallel movement. This state is the condition that the sensitivity characteristic of the overlay measurement is highest for the region-segmented image group 243. That is, the slope of a regression line calculated from the points 294a, 294b, 294c, and the like is close to that of the straight line 297, or a regression residual (corresponding to an average squared distance of vectors 293a, 293b, 293c, and the like) of the regression line is smallest. For the Y component (Dy indicated in the aforementioned Equation 2) of the overlay amount, a target value that causes the sensitivity characteristic of the overlay measurement to be highest can be calculated from a graph similar to the graph 290.

For example, when a plurality of image groups A, B, and C are present, it is desirable that all values on the straight line 297 be plotted. However, it is difficult to obtain such an ideal state. When displacements are present and corrected in units of the image groups, at least training data is plotted on the straight line 297 (the data can be correctly plotted on the straight line 297 in the range of the learning model). Since a displacement of the training data can be recognized as the tendency of the learning model and the tendency of the training data, it is possible to suppress a variation in displacements in the images. That is, it is possible to improve the sensitivity characteristic of the overlay measurement by performing the correction based on the statistical process.

(v) When the correction based on the statistical process in step S204 is performed in units of small regions, the aforementioned several types of correction may be combined and performed. In addition, in the correction in units of small regions, geometric deformation that changes the centers of gravity of the small regions 71h and the like may be performed in addition to the parallel movement. For example, as the geometric deformation, the right half of the small region 71h may be cut. This moves the center of gravity of the small region 71h toward the left side.

(vi) The training generation unit 201 may display the grouped images 270 and 270' before and after the correction, the images 30 corresponding to these images, and the region-segmented images 40 such that the correction based on the statistical process in step S204 can be confirmed on the main screen 90 or the like.

(vii) The training generation unit 201 may calculate the intermediate learning model at some stages in step S202. For example, a first intermediate learning model is calculated from the image group 231 and the region-segmented image group 241, and a second intermediate learning model is calculated form the region-segmented image group 242 for which a label is obtained from an inference result obtained by referring to the image group 232 and the first intermediate learning model in addition to the image group 231 and the region-segmented image group 241. Then, labels may be assigned to all the region-segmented images 40 within the training data 214 by referring to the second intermediate learning model and inferring the images other than the image group 232 within the image group 233.

(5) Example 4

Figure 22:
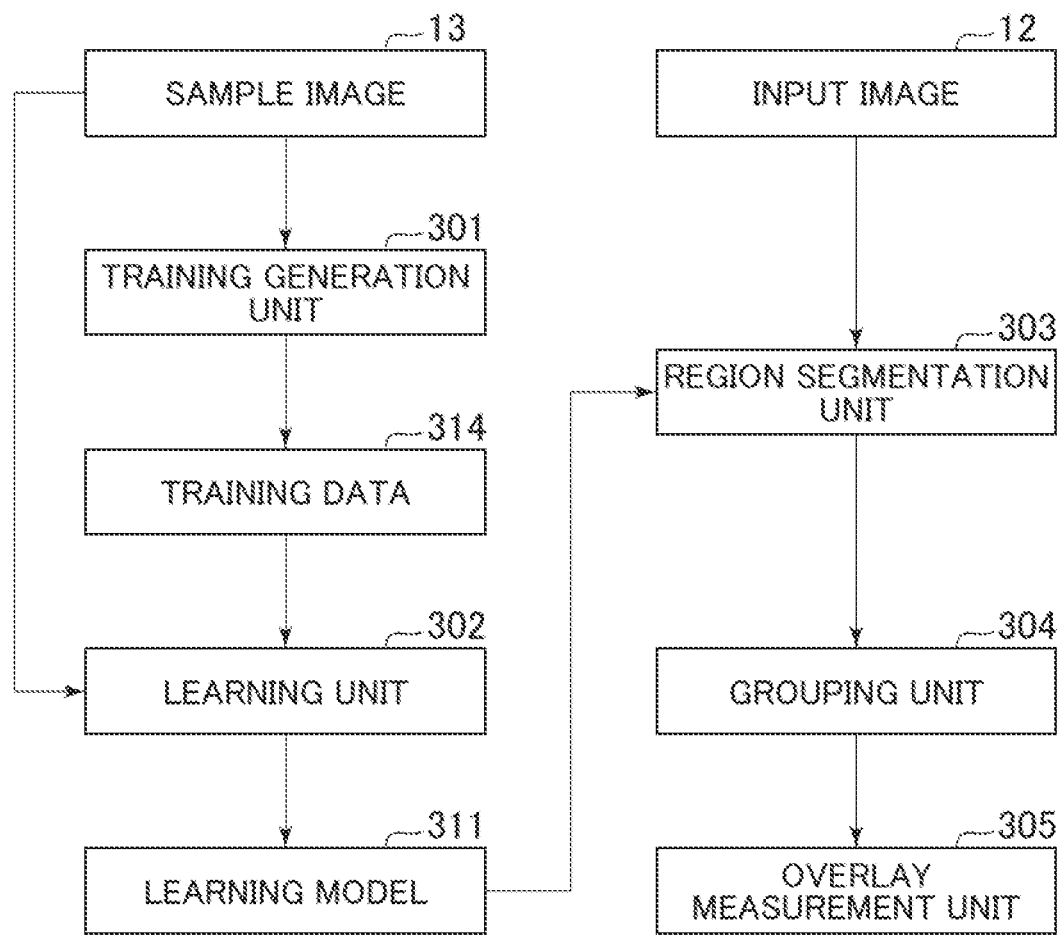
FIG. 22 is a diagram illustrating an example of a functional configuration from training data generation to overlay measurement according to Example 4.

Example 4 is described using FIGS. 22 to 25. FIG. 22 is a diagram illustrating an example of a functional configuration from training data generation to overlay measurement according to Example 4.

<Overview of Functional Configuration>

First, an overview of the functional configuration is described. A training generation unit 301 has the function of the training generation unit 1 and a function of generating a positional information image having a displacement from each pixel in the region-segmented images 40 generated on the main screen 90 (see FIG. 4) to a representative position of the small regions 71a and the like within the region-segmented images 40. The training generation unit 301 generates training data 314 obtained by adding the positional information image to the training data 14. A learning unit 302 calculates, from the images 30 included in the sample image 13, a learning model 311 that can infer the region-segmented images 40 and the positional information image included in the training data 314 as accurately as possible.

A region segmentation unit 303 refers to the learning model 311 and infers the region-segmented image 60 and the positional information image from the input image 12. A grouping unit 304 generates a grouped image 70 from the region-segmented image 60 in accordance with the same procedure as that of the grouping unit 4 and outputs the grouped image 70. An overlay measurement unit 305 performs the overlay measurement using positional information of the positional information image included in the small regions 71a and the like included in the grouped image output by the grouping unit 304.

<Details of Functional Configuration>

Each functional configuration according to Example 4 is described in detail, except for the grouping unit 304, which is not specified except for the overview.

(i) The training generation unit 301 responds to an operation by the operator on the main screen 90 and generates the training data 14 from the sample image 13. After that, the training generation unit 301 adds a positional information image 340 described later to the region-segmented images 40 included in the training data and outputs the training data 314. The positional information image 340 is described with reference to FIG. 23.

Figure 23:
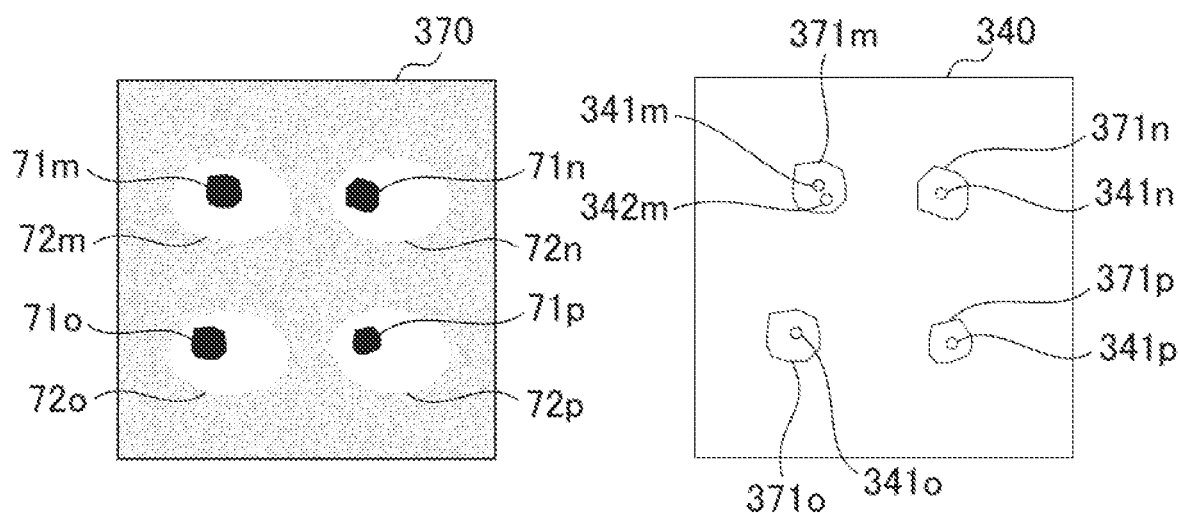
FIG. 23 is a diagram illustrating an example of a positional information image 340.

FIG. 23 is a diagram illustrating an example of the positional information image 340. In FIG. 23, an image 370 is a grouped image obtained by the grouping unit 4 from the region-segmented image 40 included in the sample image 13. The grouped image 370 is calculated from the label of the first measurement target included in the table 80 (see FIG. 10). The positional information image 340 is an image in which positional information is given to each pixel included in small regions 371m, 371n, 371o, and 371p corresponding to small regions 71m, 71n, 71o, and 71p included in the grouped image 370. The range of the small region 371m is the same as the range of the small region 71m or a range expanded from the small region 71m or obtained by calculating a circumscribed rectangle of the small region 71m and present in the vicinity of the small region 71m. Ranges of the other small regions 371n and the like are the same as those of the small regions 71n and the like or ranges in the vicinity of those of the small regions 71n and the like. When coordinates of a pixel 342m included in the small region 371m are (Xp, Yp), and X coordinates of a representative position 341m are (Xc, Yc), displacements (Rx, Ry) calculated according to the following Equations 3 and 4 are assigned to the pixel 342m. The displacements (Rx, Ry) are displacements from the pixel 342m to the representative position 341m. The representative position 341m is at coordinates of the center of gravity of the small region 371m. Displacements to the representative position 341m are assigned to each pixel included in the small region 371*m* in the same manner as the pixel 342*m*.

$$Rx = Xc - Xp \quad \text{(Equation 3)}$$

$$Ry = Yc - Yp \quad \text{(Equation 4)}$$

Similarly, displacements from each pixel included in the small regions 371*n*, 371*o*, and 371*p* in the positional information image 340 to representative positions 341*n*, 341*o*, and 341*p* of the small regions are assigned to each pixel included in the small regions 371*n*, 371*o*, and 371*p*. In the positional information image 340, attributes of invalid regions excluded in the calculation of the learning model 311 by the learning unit 302 are assigned to regions other than the small regions 371*m*, 371*n*, 371*o*, and 371*p*.

The training generation unit 301 gives a positional information image similar to the positional information image 340 to the label of the second measurement target indicated in the table 80.

(ii) The learning unit 302 calculates the learning model 311 that can infer the region-segmented images 40 included in the training data 314 and the positional information image 340 as accurately as possible. The independent neural network structure 179 can be assigned to each of the learning model that infers the region-segmented images 40 from the images 30 and the learning model that infers the positional information image 340 from the images 30. Alternatively, the two learning models may share the entire neural network structure 179 or a layer of the neural network structure 179. For example, when the image 30 is input to the input layer 170, the region-segmented image 40 may be output from a certain part of the output layer 171, and the positional information image 340 may be output from a part other than the certain part of the output layer 171 or from another layer such as the intermediate layer 174.

The learning unit 302 optimizes parameters included in the learning model 311 such that a difference between the region-segmented images 40 inferred from the images 30 included in the sample image 13 and the positional information image 340, and the corresponding region-segmented regions 40 included in the training data 314 and the positional information image 340 becomes smaller. For example, the parameters included in the learning model 311 are initialized to random numbers. After that, a difference (difference 1) between two region-segmented images 40 is treated as the number of pixels whose labels do not match, and a difference (difference 2) between the two positional information images 340 is treated as the total of absolute values of differences between displacements of pixels. In addition, values obtained by multiplying partial differential coefficients for the difference 1 and the difference 2 by a negative predetermined coefficient are sequentially added to each of the parameters in the training model 311. By repeatedly performing this process on the images 30 included in the sample image 13, the optimization can be performed. However, the optimization is not limited to this method.

Figure 24:
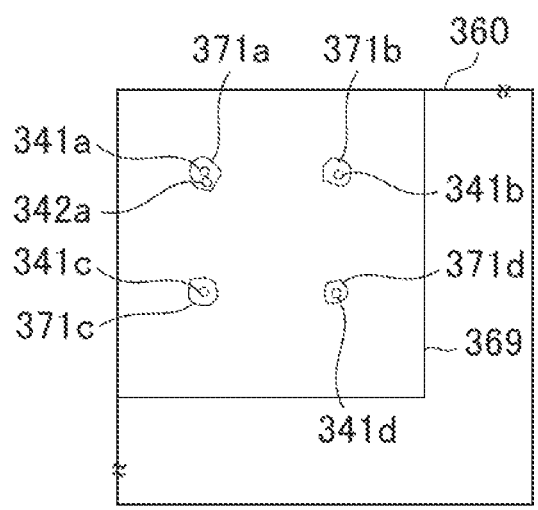
FIG. 24 is a diagram illustrating an example of a positional information image 360.

(iii) FIG. 24 is a diagram illustrating an example of a positional information image 360. The region segmentation unit 303 refers to the learning model 311 and infers the region-segmented image 60 and the positional information image 360 illustrated in FIG. 24 from the input image 12 (that is, the image 50). When the inference is accurate, a region 369 illustrated in FIG. 24 is a region in the same range as a region 59 included in the positional information image 360. In the region 369, a pixel 342*a* in a small region 371*a* includes information on inferred values (Rix, Riy) of displacements to a representative position 341*a* of the small region 371*a*. When coordinates of the pixel 342*a* are (Xip, Yip), inferred values (Xic, Yic) of the representative position 341*a* can be calculated according to the following Equations 5 and 6.

$$Xic = Rix + Xip \quad \text{(Equation 5)}$$

$$Yic = Riy + Yip \quad \text{(Equation 6)}$$

The small regions 371*a* and small regions 371*b*, 371*c*, and 371*d* are small regions in the same ranges as those of the small regions 71*a*, 71*b*, 71*c*, and 71*d* calculated by the grouping unit 4 for the label of the first measurement target in the table 80. Similarly, representative positions 341*b*, 341*c*, and 341*d* can be inferred from each pixel in the small regions 371*b*, 371*c*, and 371*d* (inferred values can be calculated) according to Equations 5 and 6. Positional information similar to that of the pixel 342*a* is stored in a portion other than the region 369 in the positional information image 360.

The region segmentation unit 303 outputs a positional information image similar to the positional information image 360 from the label of the second measurement target in the table 80.

Figure 25:
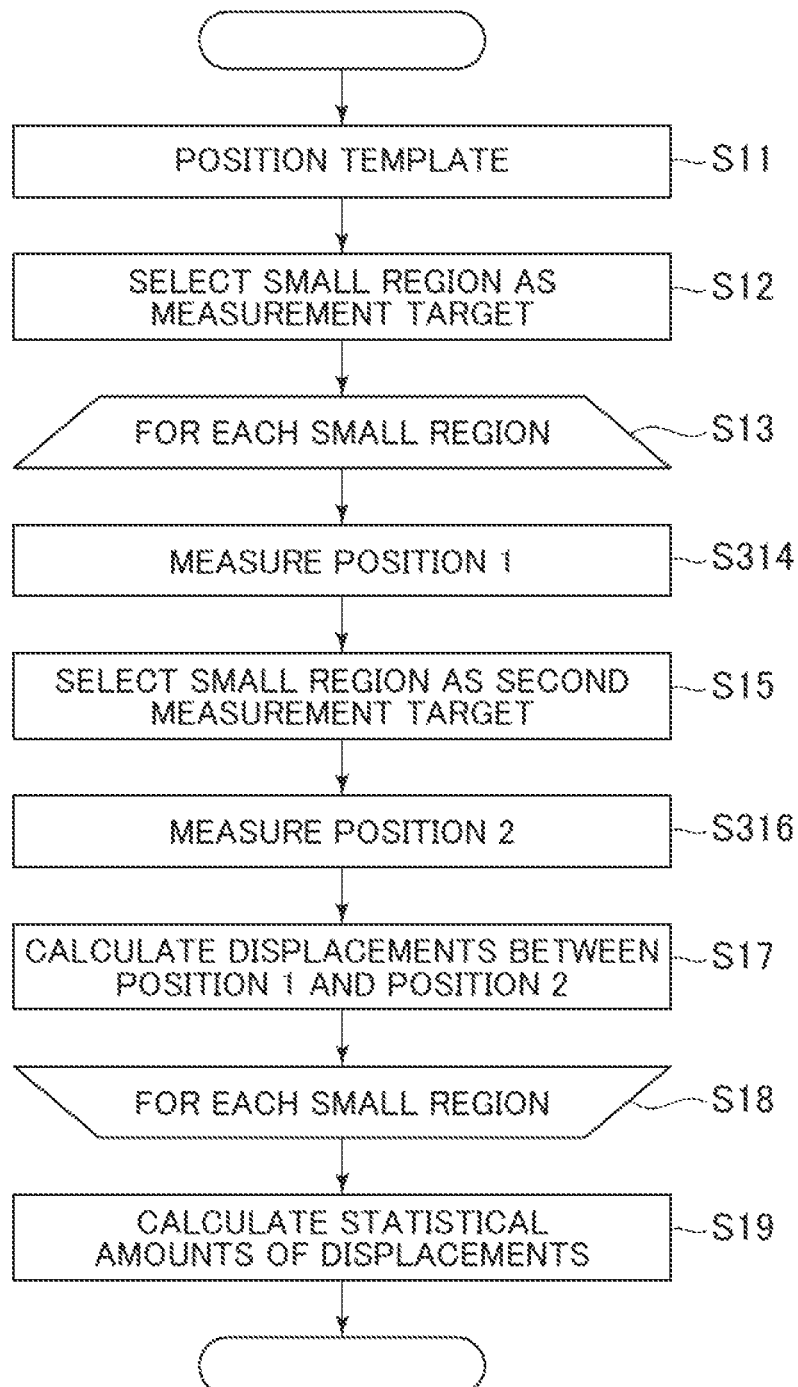
FIG. 25 is a flowchart for explaining an overlay measurement process by an overlay measurement unit 305.

(iv) The overlay measurement 305 performs the overlay measurement process according to a flowchart illustrated in FIG. 25.

Steps other than steps S314 and S316 in FIG. 25 are common to the flowchart (FIG. 11) to be performed by the overlay measurement unit 5 in the overlay measurement process, and a description thereof is omitted. The case where a loop from step S13 to step S18 is performed on the small region 371*a* is described below.

In step S314, the overlay measurement unit 305 calculates inferred values of the representative position 341*a* using the aforementioned Equations 5 and 6 from each of pixels (pixels 342*a* and the like) included in the small region 371*a* in the positional information image 360. Next, the overlay measurement unit 305 calculates the inferred values of the representative position 341*a* from each pixel, calculates statistical amounts thereof, and treats the statistical amounts as the position 1. The statistical amounts can be calculated as medians, but may be statistical amounts of arithmetic averages or the like.

In step S316, similarly, the overlay measurement unit 305 performs the same process as step S314 on the second measurement target indicated in the table 80 from the positional information image for the small region calculated for the label of the second measurement target indicated in the table 80 to calculate the position 2 (statistical amounts of the inferred values of the representative position).

Technical Effects of Example 4

According to Example 4, the overlay amount can be measured using the positional information image 360. The image quality may be reduced by random noise superimposed on the input image 12, reduced contrast, or the like. In such a case, a label in the region-segmented image 60 is not correct and the range of the small region 71*a* or the like in the grouped image 70 is not correct, but the overlay measurement can be accurately performed by using the technique disclosed in Example 4. For example, when the right half of the small region 71*a* is lost, the center of gravity of the small region 71a is shifted from the original position toward the left side, and as a result, the position 1 cannot be accurately calculated in step S14. On the other hand, in step S314, the representative position 341a can be calculated according to Equations 5 and 6 from any pixel of the small region 371a in the positional information image 370. Therefore, even when the right half of the small region 71a (that is, the small region 371a) is lost, the position 1 can be accurately calculated in step S314.

Modification of Example 4

(i) The training generation unit 301 may correct the region-segmented images 40 included in the training data 14 based on the statistical process in step S204. Thus, it is possible to perform the correction on the center of gravity of the small region 71a in the region-segmented image 40 and the like such that the reproducibility or sensitivity characteristic of the overlay measurement by the overlay measurement unit 5 is improved. Therefore, it is possible to perform the correction on each pixel (342m and the like) in the positional information image 370 included in the training data 314 determined according to the centers of gravity of the small regions (71a and the like) in the region-segmented image 40 such that the reproducibility or sensitivity characteristic of the overlay measurement is improved.

(ii) The grouping unit 304 may refer to the positional information image 360 for the calculation of the grouped image 70 from the region-segmented image 60. For example, two small regions (for example, the small regions 71m and 71n) in the grouped image 70 may be expanded from the original regions so as to be coupled to each other and form a single small region. In this case, a representative position calculated according to Equations 5 and 6 may be divided (into representative positions of 371m and 371n corresponding to 71m and 71n in the positional information image 360) in a single small region in the positional information image 360. When the representative position is divided, the single small region may be divided with reference to the division of the representative position. The division of the small region is effective in a case in which, for example, the lower image quality of the input image 12 than that of the sample image 30 causes an incorrect small region in the grouped image 70.

(6) Example 5

Example 5 discloses a technique for generating a region-segmented image (corresponding to training data) from a sample image in a limited amount, moving small regions in the region-segmented image in parallel, changing the layout of the region-segmented image and the sample image (synthesizing the region-segmented image with the sample image) to add the training data and the sample image.

<Overview of Functional Configuration>

Figure 26:
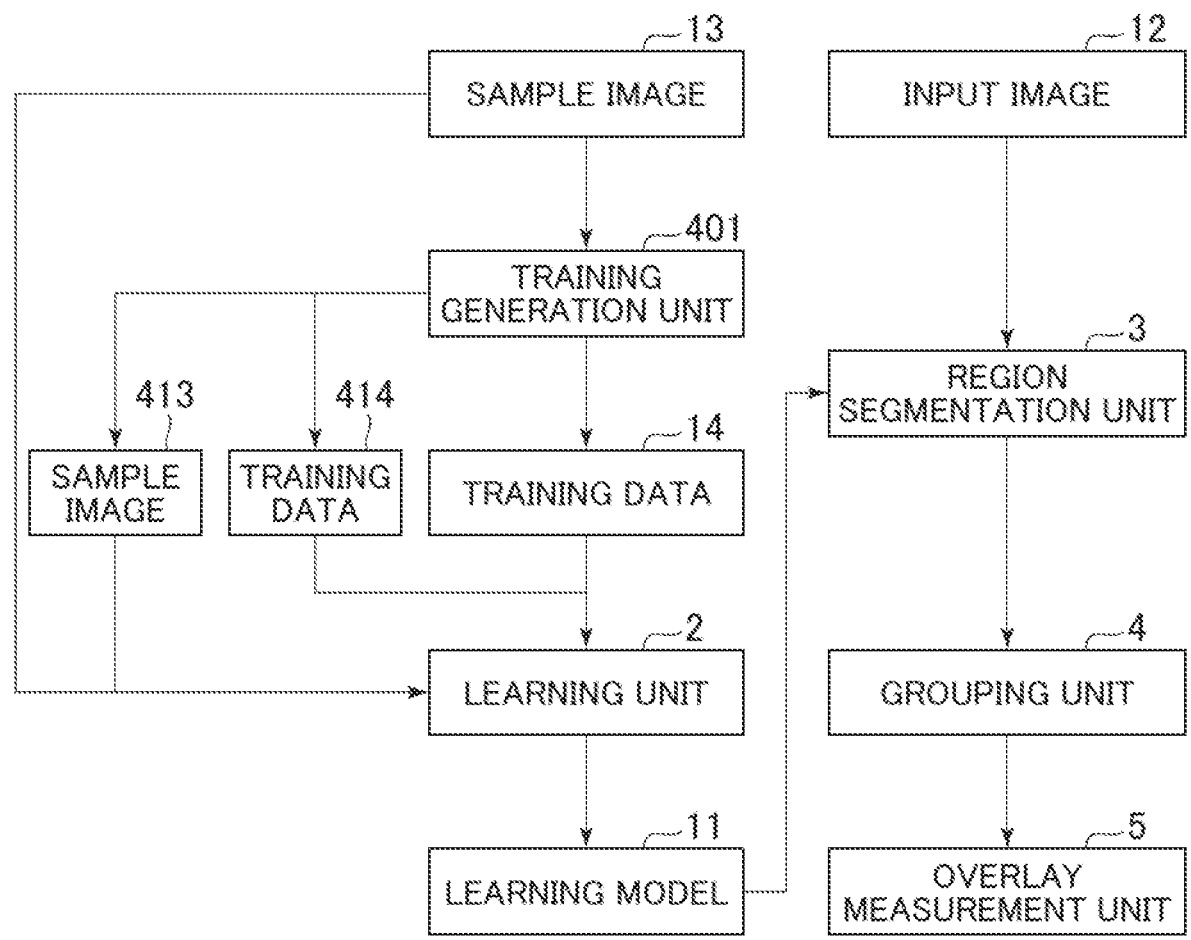
FIG. 26 is a diagram illustrating an example of a functional configuration from training data generation to overlay measurement according to Example 5.

FIG. 26 is a diagram illustrating an example of a functional configuration from training data generation to overlay measurement according to Example 5. Similarly to the training generation unit 1, a training generation unit 401 generates the training data 14 from the sample image 13 and provides a user interface therefor. In addition, the training generation unit 401 generates training data 414 in which the layout of the region-segmented images 40 in the training data 14 is changed, and outputs the training data 414. Furthermore, the training generation unit 401 has a function (hereinafter referred to as an image inference function of the training generation unit 401) of inferring the images 30 from the region-segmented images 40, infers each of the corresponding images 30 from the region-segmented images 40 in the training data 414, and outputs a sample image 413. The functions of the learning unit 2, the region segmentation unit 3, the grouping unit 4, and the overlay measurement unit 5 are the same as those described in Example 1, and a description thereof is omitted. That is, the learning unit 5 according to Example 5 treats the training data 414 as data with the same quality as that of the training data 14, treats the sample image 413 as data with the same quality as that of the sample image 13, and calculates the learning model 11 according to the same procedure as that described in Example 1.

<Details of Functional Configuration>

A process of outputting the training data 414 and the sample image 413 by the training generation unit 401 is described below in detail with reference to FIGS. 27 to 29.

Figure 27:
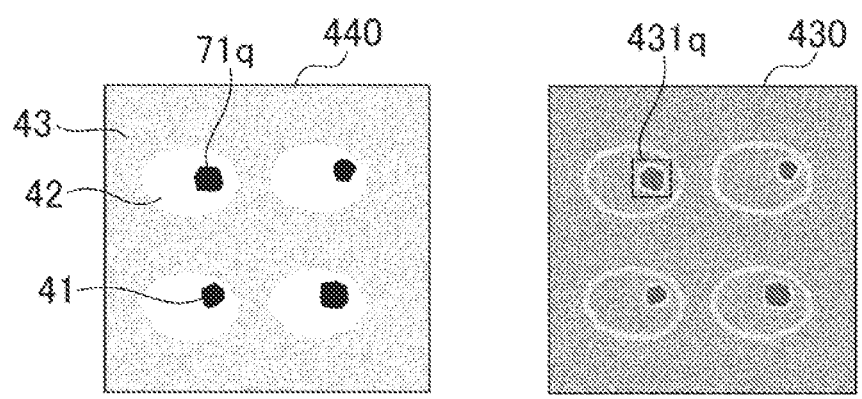
FIG. 27 is a diagram illustrating an example of an image 430 inferred from the region-segmented image 440.

(i) FIG. 27 is a diagram illustrating an example of an image 430 inferred from a region-segmented image 440. In FIG. 27, the image 440 indicates an example of a region-segmented image generated by an operator using the user interface provided by the training generation unit 401 and includes labels 41, 42, and 43. In addition, a small region 71q indicates an example of a small region with the label 41 in the region-segmented image calculated by the grouping unit 4. Furthermore, the image 430 indicates an image inferred from the region-segmented image 440 using the image inference function by the training generation unit 401. The image inference function of the training generation unit 401 can be implemented by (a) collecting a sample of a pair of an arbitrary image 30 and a region-segmented image 40, like the sample image 13 and the training data 14, in the same manner as the learning unit 2, and (b) performing learning to calculate a parameter for a structure similar to the neural network 179 that minimizes a difference between the image 30 inferred from one region-segmented image 40 and an image included in the pair of the aforementioned arbitrary image 30 and the region-segmented image 40 and corresponding to the one region-segmented image 40. In this case, the difference between the image corresponding to the region-segmented image 40 and the inferred image 30 can be calculated by aggregating the absolute sum of brightness differences between pixels, but the calculation is not limited to this method. In addition to the aforementioned method, the image inference function of the training generation unit 401 can be implemented by using, for example, a machine learning algorithm, which excels at generating an image from a random number or a symbol and is called a hostile generation network, to determine a parameter in a network structure similar to the neural network structure 179.

In the network structure similar to the neural network structure 179, the inference may be performed in units of receptive fields 176 in the same manner as in the network structure 179. That is, for each of pixels of the region-segmented image 40, the brightness of the pixel at the same coordinates as a pixel in the image 30 is determined from a range of a receptive field 176 around the pixel in the region-segmented image 40.

Figure 28:
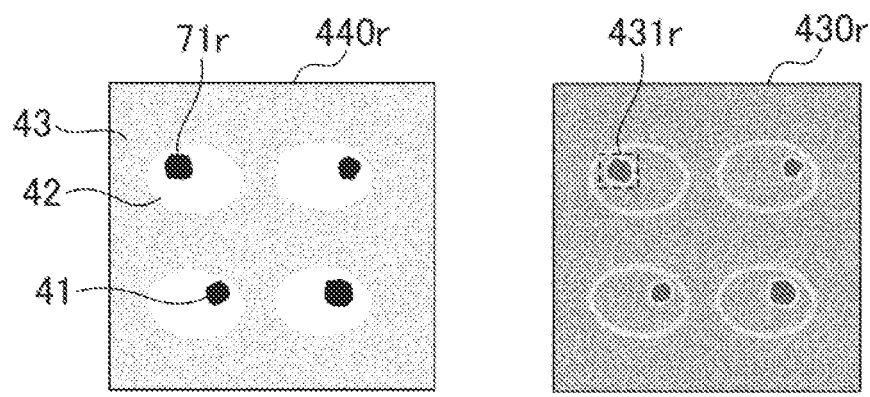
FIG. 28 is a diagram illustrating an example in a case in which the layout of a small region 71q is changed in the region-segmented image 440.
Figure 29:
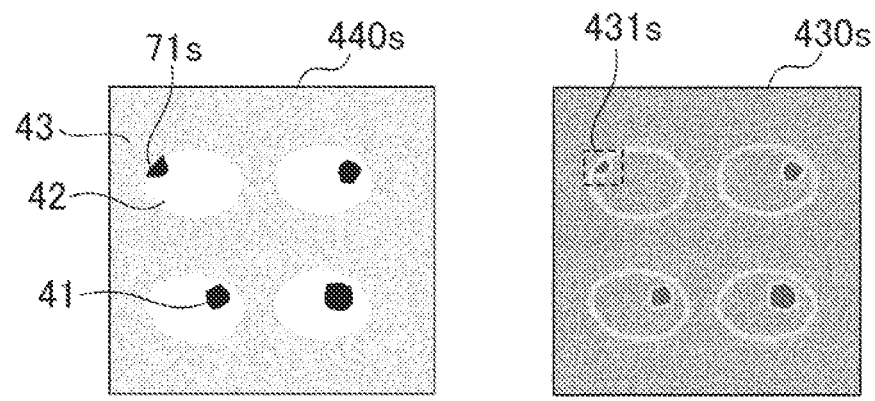
FIG. 29 is a diagram illustrating an example (example when it is determined that labels 43, 41, and 42 are present on the front side in this order) in a case in which occlusion occurs when the layout of the small region 71q is changed in the region-segmented image 440.

(ii) FIG. 28 is a diagram illustrating an example in which the layout of the small region 71q is changed in the region-segmented image 440. In FIG. 28, in a region-segmented image 440r, the layout in which the small region 71q in the region-segmented image 440 is moved to a small region 71r in parallel is changed. Due to the effect of the inference in units of receptive fields 176, it is found that an image in a small region 431q corresponding to the small region 71q is moved to a small region 431r in the small region 71r when an image 430r inferred from the region-segmented image 440r is compared with the image 430 corresponding to the region-segmented image 440. When attention is paid to the small regions 431q and 431r, the image corresponds to an image in which an overlay amount changes by the amount of the parallel movement from the small region 71q to the small region 71r. Therefore, in the region-segmented image 440r, when all the small regions 71r and the like are moved in parallel by only a uniform amount, the image 430r becomes an image with an overlay amount changed by only the uniform amount from that of the image 430.

Technical Effects of Example 5

According to Example 5, the training data 414 can be added to the training data 14 due to the change in the layout. In addition, the sample image 413 can be added to the sample image 13 by changing the layout and using the image inference function of the training generation unit 401. For example, even when the sample image 13 is constituted by images 30 with a uniform overlay amount, it is possible to add region-segmented images 40 with various overlay amounts and the images 30 to the training data 14 and the sample image 13 by changing the layout. Therefore, the operator does not need to prepare many sample images having various layouts in advance and it is possible to omit an effort for the overlay measurement.

Modification of Example 5

(i) In addition to the above-mentioned parallel movement, any geometrical deformation that is enlargement, reduction, or the like and causes a change in an overlay amount can be applied to the layout change.
(ii) Depth information of the labels 41, 42, and 43 in the region-segmented image 440 may be determined in advance. Therefore, the training generation unit 401 can infer an image formed in consideration of occlusion between labels. FIG. 29 is a diagram illustrating an example (example in which the labels 41, 42, and 43 are present on the front side in this order) in which the occlusion occurs when the layout of the small region 71q is changed in the region-segmented image 440. As illustrated in FIG. 29, a range of overlapping with the label 43 when the small region 71q in the region-segmented image is moved to a small region 71s in parallel is deleted. As a result, an image formed in consideration of occlusion is inferred for a small region 431s corresponding to the small region 71s in an image 430s inferred from a region-segmented image 440s. Therefore, it is possible to synthesize the region-segmented image 430 closer to the real image due to occlusion between labels.
(iii) Although each Example is implemented independently of each other, the aforementioned Examples 1 to 5 may be implemented by combining some or all of the Examples.

(7) Example 6

Example 6 describes an example in which the training data generation process, the learning model generation process, and the region segmentation process in Examples 1 to 5 are applied to a measurement process other than the overlay measurement.

Figure 30:
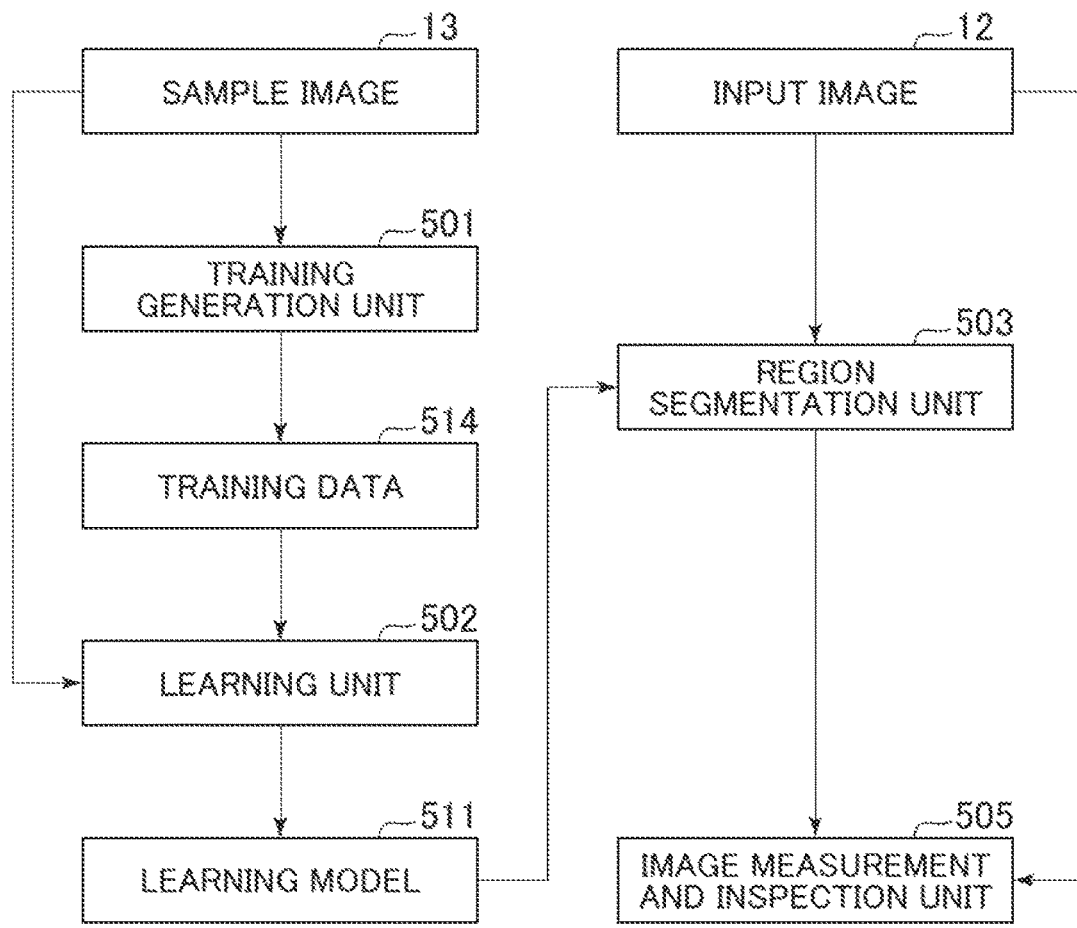
FIG. 30 is a diagram illustrating an example of a functional configuration from training data generation to image measurement inspection according to Example 6.

FIG. 30 is a diagram illustrating an example of a functional configuration from training data generation to image measurement and inspection according to Example 6. In FIG. 30, a training generation unit 501 corresponds to any of the training generation units 1, 101, 201, 301, and 401 according to Examples 1 to 5. Similarly, training data 514, a learning unit 502, a learning model 511, and a region segmentation unit 503 correspond to the training data, the learning unit, the learning model, and the region segmentation unit according to any of Examples 1 to 5, respectively.

An image measurement and inspection unit 505 uses a region-segmented image 60 inferred by the region segmentation unit 503 from the input image 12 to inspect and measure an image. The inspection and the measurement are not limited to the overlay measurement. Examples of the image inspection and the measurement by the image measurement and inspection unit 505 are the extraction of a contour in a semiconductor image, dimension measurement of a hole shape and the like, the detection of a defective pattern such as a short-circuit defect, pattern matching for inferring a design diagram from an image and searching for a position where the inferred design diagram matches an actual design diagram, and the like. However, the image inspection and the measurement are not limited thereto, and can be applied to any application for performing image measurement using the region-segmented image 60 inferred by the region segmentation unit 503. In addition, the image measurement and inspection unit 505 may supplementarily refer to the input image 12 and other data illustrated in FIG. 30 in order to correct the region-segmented image 60. Furthermore, in Example 6, the sample image 13 and the input image 12 may be images obtained by imaging another object other than semiconductors.

(i) In the case where the functions of the training generation unit 501, the learning unit 502, and the region segmentation unit 503 have the functions described in Example 1

For example, for inference by the learning model 511 in units of receptive fields 176, when a periodical pattern is included in the input image 12, dimensions of the images 30 included in the sample image 13 when labels of the training data 14 are assigned in the training generation unit 501 are dimensions smaller than the images 60 included in the input image 12. Therefore, it is possible to reduce the number of processes of assigning the labels of the training data 14 by the operator.

(ii) In the case where the functions of the training generation unit 501, the learning unit 502, and the region segmentation unit 503 have the functions described in Example 2

For example, by using a plurality of combinations of images obtained under different imaging conditions, it is possible to accurately generate the training data 114 using an image in which a target structure is clear among the images 30a, 30b, and the like and accurately perform the inference by the region segmentation unit 503.

(iii) In the case where the functions of the training generation unit 501, the learning unit 502, and the region segmentation unit 503 have the functions described in Example 3

For example, by narrowing down a target to which training data is assigned in the sample image 213 to the image group 231 using the main screen 90, it is possible to reduce the number of processes by the operator. In addition, by performing steps S202 and S203 illustrated in FIG. 19 according to Example 3, it is possible to obtain the training data 514 (corresponding to the training data 214) for all remaining images of the sample image 13. Furthermore, by performing steps S204 and S205, it is possible to correct the training data 514 (corresponding to the training data 214).

(iv) In the case where the functions of the training generation unit 501, the learning unit 502, and the region segmentation unit 503 have the functions described in Example 4

It is possible to perform the image measurement using the region-segmented image 60 calculated from the input image 12 and the positional information image 360.

(v) In the case where the functions of the training generation unit 501, the learning unit 502, and the region segmentation unit 503 have the functions described in Example 5

For example, by using the image inference function of the training generation unit 501 to change the layout in the region-segmented image 40, the sample image 413 and the training data 414 (the training data 14 and the training data 414 are combined to form the training data 514) are added to the sample image 13 and the training data 14.

Technical Effects of Example 6

Example 6 demonstrates that the techniques disclosed in Examples 1 to 5 can be applied to an entire system for not only performing the overlay measurement but also performing image measurement and image inspection using a region-segmented image.

(8) Other Examples

Each Example can be implemented by a software program code. In this case, a recording medium storing the program code is provided to a system or an apparatus, and a computer (or a CPU or an MPU) of the system or the apparatus reads the program code stored in the recording medium. In this case, the program code read from the recording medium implements the functions described above in the embodiment, and the program code and the recording medium storing the program code are included in the present disclosure. As the recording medium for supplying the program code, for example, a flexible disk, a CD-ROM, a DVD-ROM, a hard disk, an optical disc, magneto-optical disc, a CD-R, a magnetic tape, a nonvolatile memory card, a ROM, or the like is used.

An OS (operating system) executed on the computer may perform some or all of the actual processes based on an instruction of the program code, and the functions described above in the embodiment may be implemented by the processes. In addition, after the program code read from the recording medium is written to a memory in the computer, the CPU of the computer or the like may perform some or all of the actual processes based on an instruction of the program code, and the functions described above in the embodiment may be implemented by the processes.

In addition, the software program code that implements the functions of the embodiment may be distributed via a network, stored in storage means such as a hard disk or a memory of the system or the apparatus or a recording medium such as a CD-RW or a CD-R, and the computer (or the CPU or the MPU) of the system or the apparatus may read and execute the program code stored in the storage means or the recording medium at the time of the use.

LIST OF REFERENCE SIGNS 1, 101, 201, 301, 401, 501 Training generation unit
2, 102, 302, 502 Learning unit
3, 103, 303, 503 Region segmentation unit
4, 104, 304 Grouping unit
5, 105, 305 Overlay measurement unit
11, 111, 311, 511 Learning model
12, 112 Input image
13, 113, 213, 413 Sample image
14, 114, 214, 314, 414, 514 Training data
190 Main processor
190a first sub-processor
190b Second sub-processor
191 Main calculator
191a First sub-calculator
191b Second sub-calculator
192 Input and output device
193 Electronic Microscope or the like
505 Image measurement and inspection unit

The invention claimed is:

1. A measurement system that performs image measurement of a semiconductor having a periodical structure, comprising:
at least one processor that performs various processes relating to the image measurement; and
an output device that outputs a result of the image measurement, wherein
the at least one processor performs
a process of generating training data from a sample image of the semiconductor,
a process of generating a learning model based on the sample image and the training data,
a process of generating a region-segmented image from an input image relating to the semiconductor based on the learning model,
a measurement process of performing the image measurement using the region-segmented image, and
a process of outputting a result of the measurement process to the output device,
the training data is an image in which a label including a structure of the semiconductor in the sample image is assigned to each of pixels of the image,
the learning model includes a parameter for inferring the training data or the region-segmented image from the sample image or the input image,
the sample image and the training data are smaller than the input image and include an image region corresponding to the periodical structure, and
the at least one processor generates the parameter of the learning model from the sample image and the training data in the process of generating the learning model.

2. The measurement system according to claim 1, wherein the learning model is a machine learning model that refers to a region present near each of the pixels in the input image in order to determine the label assigned to each of the pixels.

3. The measurement system according to claim 1, wherein the learning model is a convolution neural network.

4. The measurement system according to claim 1, wherein the image region corresponds to a structure of at least one period in the periodical structure.

5. A measurement system that performs image measurement of a semiconductor having a predetermined structure, comprising:
at least one processor that performs various processes relating to the image measurement; and an output device that outputs a result of the image measurement, wherein the at least one processor performs a process of generating training data from a sample image of the semiconductor, a process of generating a learning model based on the sample image and the training data, a process of generating a region-segmented image from an input image relating to the semiconductor based on the learning model, a measurement process of performing the image measurement using the region-segmented image, and a process of outputting a result of the measurement process to the output device, the training data is an image in which a label including a structure of the semiconductor in the sample image is assigned to each of pixels of the image, the learning model includes a parameter for inferring the training data or the region-segmented image from the sample image or the input image, the at least one processor performs a process of segmenting the region-segmented image into small regions of an image size smaller than the region-segmented image according to the label and grouping the small regions based on types of the small regions, and the at least one processor performs overlay measurement from the center of gravity of each of the grouped small regions as the measurement process.

6. A measurement system that performs image measurement of a semiconductor having a predetermined structure, comprising:

at least one processor that performs various processes relating to the image measurement; and an output device that outputs a result of the image measurement, wherein the at least one processor performs a process of generating training data from a sample image of the semiconductor, a process of generating a learning model based on the sample image and the training data, a process of generating a region-segmented image from an input image relating to the semiconductor based on the learning model, a measurement process of performing the image measurement using the region-segmented image, and a process of outputting a result of the measurement process to the output device, the training data is an image in which a label including a structure of the semiconductor in the sample image is assigned to each of pixels of the image, the learning model includes a parameter for inferring the training data or the region-segmented image from the sample image or the input image, the sample image includes a combination of images under different imaging conditions obtained by imaging the same position on the semiconductor under the different imaging conditions a plurality of times, and the at least one processor generates the training data from the sample image according to the different imaging conditions and generates the learning model based on the training data generated according to the imaging conditions and the sample image.

7. A measurement system that performs image measurement of a semiconductor having a predetermined structure, comprising:

at least one processor that performs various processes relating to the image measurement; and an output device that outputs a result of the image measurement, wherein the at least one processor performs a process of generating training data from a sample image of the semiconductor, a process of generating a learning model based on the sample image and the training data, a process of generating a region-segmented image from an input image relating to the semiconductor based on the learning model, a measurement process of performing the image measurement using the region-segmented image, and a process of outputting a result of the measurement process to the output device, the training data is an image in which a label including a structure of the semiconductor in the sample image is assigned to each of pixels of the image, the learning model includes a parameter for inferring the training data or the region-segmented image from the sample image or the input image, the imaging under the different imaging conditions includes at least one of imaging with different acceleration voltages, capturing different types of electron images, and changing a synthesis ratio for generation of a synthesized image of different types of electron images.

8. A measurement system that performs image measurement of a semiconductor having a predetermined structure, comprising:

at least one processor that performs various processes relating to the image measurement; and an output device that outputs a result of the image measurement, wherein the at least one processor performs a process of generating training data from a sample image of the semiconductor, a process of generating a learning model based on the sample image and the training a process of generating a region-segmented image from an input image relating to the semiconductor based on the learning model, a measurement process of performing the image measurement using the region-segmented image, and a process of outputting a result of the measurement process to the output device, the training data is an image in which a label including a structure of the semiconductor in the sample image is assigned to each of pixels of the image, the learning model includes a parameter for inferring the training data or the region-segmented image from the sample image or the input image, the at least one processor segments the sample image into two or more sample image groups, assigns the label to an image included in a first sample image group to generate first training data, generates an intermediate learning model based on the image of the first sample image group and the first training data, adds training data generated by inferring an image included in an image group other than the first sample image group based on the intermediate learning model to the first training data to generate second training data, and generates, based on the sample image and the second training data, the learning model to be applied to the input image.

9. The measurement system according to claim 8, wherein the at least one processor performs correction based on a statistical process on the training data generated by inferring the image included in the image group other than the first sample image group.

10. The measurement system according to claim 9, wherein
the at least one processor performs the correction based on the statistical process on a plurality of images obtained by repeatedly imaging the same position on the semiconductor.

11. The measurement system according to claim 9, wherein
the at least one processor extracts partial regions having a high similarity among the partial regions in the sample image and performs the correction based on the statistical process on the extracted partial regions.

12. The measurement system according to claim 9, wherein
the correction based on the statistical process is to move the small regions in parallel in units of the small regions to which the label is assigned in the second training data or geometrically deform the small regions in units of the small regions to which the label is assigned in the second training data.

13. The measurement system according to claim 5, wherein
the training data includes a positional information image indicating a displacement from each of the pixels to representative positions of the small regions to which the label is assigned, and
the at least one processor generates the region-segmented image of the input image and the positional information image based on the learning model including the positional information image and uses the positional information image to perform the overlay measurement on the grouped small regions.

14. The measurement system according to claim 13, wherein the positional information image indicates the displacement calculated using the training data subjected to the correction based on the statistical process.

15. A measurement system that performs image measurement of a semiconductor having a predetermined structure, comprising:
at least one processor that performs various processes relating to the image measurement; and
an output device that outputs a result of the image measurement, wherein
the at least one processor performs
a process of generating training data from a sample image of the semiconductor,
a process of generating a learning model based on the sample image and the training
a process of generating a region-segmented image from an input image relating to the semiconductor based on the learning model,
a measurement process of performing the image measurement using the region-segmented image, and
a process of outputting a result of the measurement process to the output device,
the training data is an image in which a label including a structure of the semiconductor in the sample image is assigned to each of pixels of the image,
the learning model includes a parameter for inferring the training data or the region segmented image from the sample image or the input image,
the at least one processor performs a process of changing the layout of the training data to generate changed training data, adding the changed training data to the training data before the layout change to obtain updated training data, and a process of adding an image inferred from the changed training data to the sample image to obtain an updated sample image, and
the at least one processor generates the learning model based on the updated training data and the updated sample image.

16. The measurement system according to claim 15, wherein
the at least one processor changes the layout of the training data in consideration of occlusion between labels included in the training data.

17. The measurement system according to claim 1, wherein
the measurement process is an overlay measurement process, a dimension measurement process, a defective pattern detection process, or a pattern matching process that is performed on the semiconductor.

18. A method for generating a learning model to be used when performing image measurement of a semiconductor including a predetermined structure, the method comprising:
causing at least one processor to generate training data by assigning a label including a structure of at least one measurement target to a region-segmented image obtained from a sample image of the semiconductor; and
causing the at least one processor to generate the learning model using the region-segmented image of the sample image and the training data based on a network structure of a plurality of layers, wherein
the learning model includes a parameter for inferring the training data or the region-segmented image from the sample image or the input image related to the semiconductor,
the at least one processor performs a process of segmenting the region-segmented image into small regions of an image size smaller than the region-segmented image according to the label and grouping the small regions based on types of the small regions, and
the at least one processor performs overlay measurement from the center of gravity of each of the grouped small regions as the measurement process.

19. A non-transitory recording medium storing a program for causing a computer to execute processing for generating a learning model to be used when performing image measurement of a semiconductor including a predetermined structure, the program causing the computer to execute:
processing for generating training data by assigning a label including a structure of at least one measurement target to a region-segmented image obtained from a sample image of the semiconductor; and
processing for generating the learning model using the region-segmented image of the sample image and the training data based on a network structure of a plurality of layers by the at least one processor, wherein
the learning model includes a parameter for inferring the training data or the region-segmented image from the sample image or the input image related to the semiconductor, and
the program further causes the computer to execute:
performing a process of segmenting the region-segmented image into small regions of an image size smaller than the region-segmented image according to the label and grouping the small regions based on types of the small regions, and performing overlay measurement from the center of gravity of each of the grouped small regions as the measurement process.

\* \* \* \* \*